(12) United States Patent
Muck et al.

(10) Patent No.: US 12,194,903 B2
(45) Date of Patent: Jan. 14, 2025

(54) SEAT ASSEMBLIES HAVING FIXED FRAMES AND MOVABLE SEAT CUSHIONS AND MOVABLE SEAT BACKS WITH UPPER PIVOT MECHANISMS AND RIGID LINKAGE ASSEMBLIES

(71) Applicant: Toyota Motor Engineering & Manufacturing North America, Inc., Plano, TX (US)

(72) Inventors: Todd Rupert Muck, Fowlerville, MI (US); Charles P. Patterson, New Boston, MI (US); Peter J. Moegling, Whitmore Lake, MI (US); Matthew R. Speck, Plymouth, MI (US); Leon T. Toma, Commerce Township, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 17 days.

(21) Appl. No.: 17/873,572

(22) Filed: Jul. 26, 2022

(65) Prior Publication Data
US 2023/0030120 A1     Feb. 2, 2023

Related U.S. Application Data

(60) Provisional application No. 63/227,174, filed on Jul. 29, 2021.

(51) Int. Cl.
*B60N 2/64*     (2006.01)
*B60N 2/42*     (2006.01)
*B60N 2/52*     (2006.01)

(52) U.S. Cl.
CPC .............. *B60N 2/64* (2013.01); *B60N 2/4242* (2013.01); *B60N 2/522* (2013.01)

(58) Field of Classification Search
CPC ......... B60N 2/4242; B60N 2/64; B60N 2/522
USPC ................... 297/353, 354.1, 357, 358, 440.2
See application file for complete search history.

(56) References Cited

U.S. PATENT DOCUMENTS

| 3,093,408 A | 6/1963 | Fletcher |
| 4,423,848 A * | 1/1984 | Mazelsky ............... B64D 25/04 |
| | | 297/216.16 |
| 5,466,043 A | 11/1995 | Lambert et al. |
| 6,371,558 B1 | 4/2002 | Couasnon |

(Continued)

FOREIGN PATENT DOCUMENTS

EP     3275725 A1     10/2018

*Primary Examiner* — Anthony D Barfield
(74) *Attorney, Agent, or Firm* — Dinsmore & Shohl LLP

(57) ABSTRACT

A kinetic seat assembly includes a primary seat back frame, a secondary seat back frame, and an upper pivot mechanism coupling the secondary seat back frame to the primary seat back frame. The upper pivot mechanism includes a bracket, and a pivotable link extending from a pair of opposite sides of the bracket and interconnecting the bracket and the primary seat back frame. A first end of each of the pivotable links is pivotally attached to the bracket, which is coupled to the secondary seat back frame, and an opposite second end each of the pivotable links is pivotally fixed to the primary seat back frame. The secondary seat back frame is permitted to move in a kinetic seat vertical direction relative to the primary seat back frame as the pivotable links permit the bracket to move in the kinetic seat vertical direction relative to the primary seat back frame.

9 Claims, 27 Drawing Sheets

(56) References Cited

U.S. PATENT DOCUMENTS

| | | |
|---|---|---|
| 7,997,653 B2 | 8/2011 | Szybisty et al. |
| 8,313,144 B2 | 11/2012 | Holdampf |
| 8,641,140 B2 | 2/2014 | Swierczewski |
| 9,283,873 B2 | 3/2016 | Line et al. |
| 9,592,749 B2 | 3/2017 | Boehm et al. |
| 9,656,578 B2 | 5/2017 | Mitsuhashi |
| 9,873,354 B2 | 1/2018 | Poulos et al. |
| 10,675,994 B2 | 6/2020 | Fitzpatrick et al. |
| 2018/0072187 A1* | 3/2018 | Katoh .................. B60N 2/7094 |
| 2019/0111816 A1 | 4/2019 | Katoh |
| 2019/0202324 A1* | 7/2019 | Ketels |
| 2021/0237631 A1 | 8/2021 | Muck et al. |

* cited by examiner

SEAT ASSEMBLIES HAVING FIXED FRAMES AND MOVABLE SEAT CUSHIONS AND MOVABLE SEAT BACKS WITH UPPER PIVOT MECHANISMS AND RIGID LINKAGE ASSEMBLIES

CROSS-REFERENCE TO RELATED APPLICATION

This application claims the priority benefit of U.S. Provisional Patent Application No. 63/227,174, filed Jul. 29, 2021, for "Seat Assembly Having Fixed Frame And Movable Seat Cushion And Movable Seat Back," which is hereby incorporated by reference in its entirety including the drawings.

TECHNICAL FIELD

The present specification generally relates to kinetic seat assemblies for vehicles and, more specifically, kinetic seat assemblies for vehicles that accommodate rotation of an occupant's body during turning operations with a force applied in a counter-turning direction.

BACKGROUND

When driving a vehicle, the driver typically experiences fatigue due to repeated rotation of the driver's torso and pelvis. In addition, a driver's knees and head are also rotated during turning of the vehicle. Thus, this movement requires the driver to continuously compensate for rotation during turning. Over time, this rotation of the driver's torso, pelvis, knees, and head can lead to various aches and pains limiting the amount of driving time one can withstand.

It has been known to provide a seat assembly including a seat back and a seat cushion that mimic the walking movement of an occupant's pelvis and torso. Specifically, the known seat assembly allows the seat cushion to pivot at a cushion pivot axis and the seat back to pivot at a seat back pivot axis such that the seat back and the seat cushion pivot in opposite directions. However, rotating the pelvis and the torso in opposite directions during turning may cause discomfort in some drivers.

Accordingly, a need exists for alternative kinetic seat assemblies that offer torso rotation and pelvic rotation in the same direction to maintain a centered position of the driver's head and knees.

SUMMARY

In one embodiment, a kinetic seat assembly includes: a primary seat back frame; a secondary seat back frame; and an upper pivot mechanism coupling the secondary seat back frame to the primary seat back frame, the upper pivot mechanism including: a bracket; and a pivotable link extending from each of a pair of opposite sides of the bracket and interconnecting the bracket and the primary seat back frame, a first end of each of the pivotable links pivotally attached to the bracket, which is coupled to the secondary seat back frame, and an opposite second end each of the pivotable links pivotally fixed to the primary seat back frame, wherein the secondary seat back frame is permitted to move in a vehicle vertical direction relative to the primary seat back frame as the pivotable links permit the bracket to move in the vehicle vertical direction relative to the primary seat back frame.

In another embodiment, a kinetic seat assembly includes: a secondary seat cushion frame; a secondary seat back frame; and a linkage assembly including: a connection bracket having a first end and an opposite second end, the first end fixed to the secondary seat cushion frame; and a connector bracket fixed to a front surface of the connection bracket, the connector bracket including a base wall fixed to the front surface of the connection bracket and a pair of side walls extending from opposite ends of the base wall and perpendicular to the base wall, an opening formed in each side wall of the pair of side walls, wherein the secondary seat back frame pivotally fixed to the connector bracket at the opening formed in each side wall of the pair of side walls.

In yet another embodiment, a vehicle includes: a passenger compartment; and a kinetic seat assembly within the passenger compartment, the kinetic seat assembly including: a primary seat cushion frame; a secondary seat cushion frame pivotally coupled to the primary seat cushion frame; a primary seat back frame; a secondary seat back frame pivotally coupled to the primary seat back frame; a linkage assembly interconnecting the secondary seat back frame to the secondary seat cushion frame, the linkage assembly restricting movement of the secondary seat back frame and the secondary seat cushion frame to being in phase with one another; and an upper pivot mechanism pivotally coupling the primary seat back frame and the secondary seat back frame.

In yet another embodiment, a kinetic seat assembly includes: a primary seat cushion frame; a secondary seat cushion frame pivotally coupled to the primary seat cushion frame; a primary seat back frame; a secondary seat back frame pivotally coupled to the primary seat back frame; a linkage assembly including: a connection bracket fixed to the secondary seat cushion frame; and a connector bracket fixed to the connection bracket, the connector bracket pivotally fixed to the secondary seat back frame; a pair of vertical dampers extending between the connection bracket and the primary seat back frame; and a pair of lateral dampers extending between the primary seat back frame and the secondary seat back frame.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
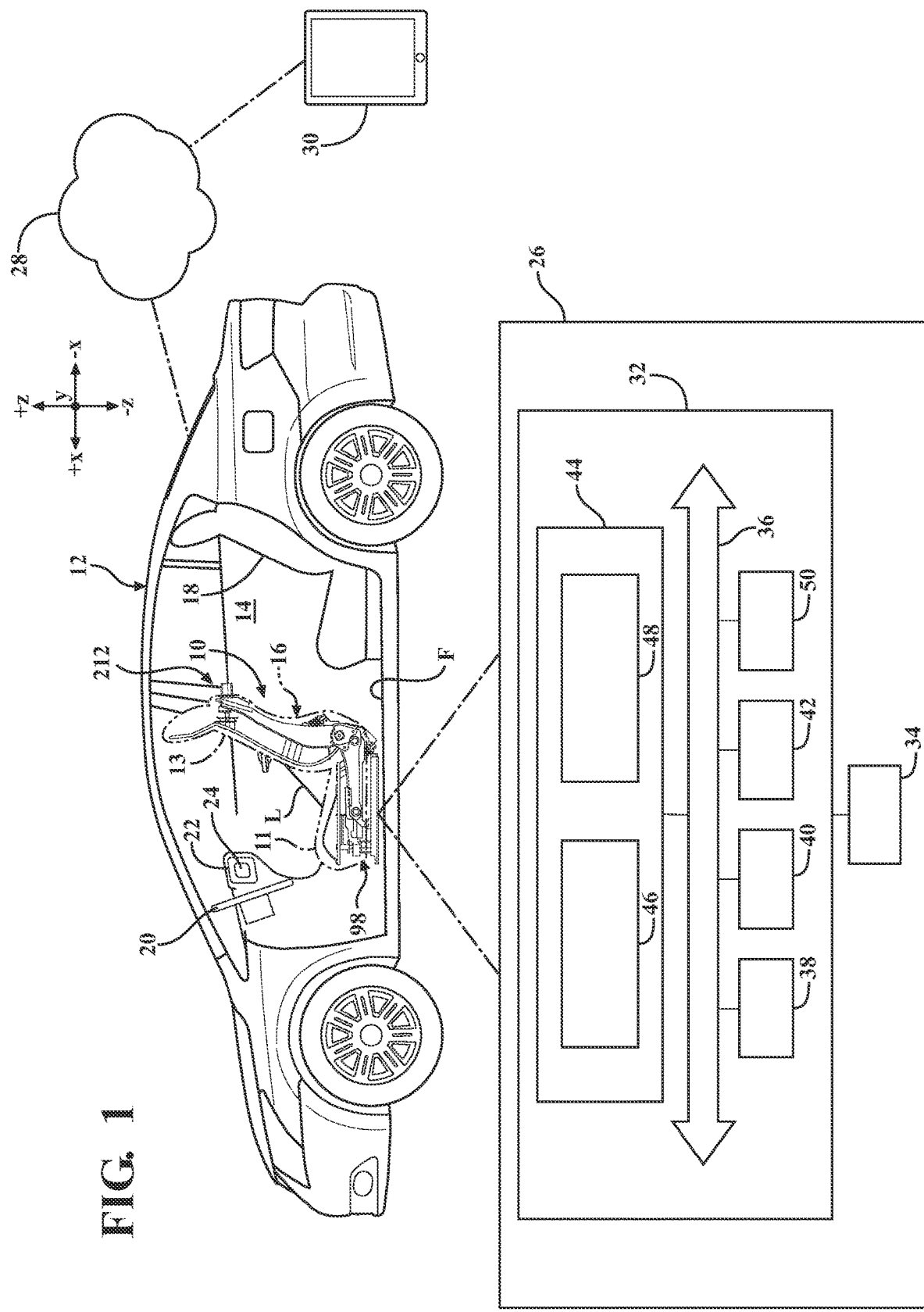
FIG. 1 schematically depicts a system for a vehicle having kinetic seat assembly, according to one or more embodiments shown and described herein, and illustrated in a vehicle as a driver's seat.

FIG. 1 generally depicts an environmental view of an embodiment of a vehicle including a kinetic seat assembly. The vehicle general comprises a passenger compartment which passengers or other occupants occupy. A plurality of vehicle seats including a front driver seat, front passenger seat, and one or more rear passenger seats may be provided within the passenger compartment of the vehicle.

As shown, the kinetic seat assembly is utilized as the driver's seat. However, it is to be understood that a plurality of kinetic seat assemblies may be utilized as multiple seats of the vehicle. The kinetic vehicle seat assembly generally comprises a kinetic seat cushion assembly, a kinetic seat back assembly, a vertical damping mechanism, and a lateral damping mechanism. The kinetic seat cushion assembly includes a primary seat cushion frame, a secondary seat cushion frame, and a front pivot mechanism that pivotally couples a front portion of the primary seat cushion frame to a front portion of the secondary seat cushion frame. The kinetic seat back assembly includes a primary seat back frame, a secondary seat back frame, and an upper pivot mechanism that pivotally couples an upper portion of the primary seat back frame to an upper portion of the secondary seat back frame.

The vertical damping mechanism provides a damping effect as the secondary seat cushion frame and the secondary seat back frame move in a vehicle vertical direction. The lateral damping mechanism provides a damping effect as a rear end of the secondary seat cushion frame and a lower end of the secondary seat back frame move in a vehicle lateral direction. The front pivot mechanism allows the secondary seat cushion frame to rotate with respect to the primary seat cushion frame. Similarly, the upper pivot mechanism allows the secondary seat back frame to rotate, and in some embodiments move in the vehicle vertical direction, with respect to the primary seat back frame.

During a turning operation, the occupant and the kinetic seat assembly receive a force pushing the occupant and the kinetic seat assembly in an opposite direction of the turning operation. Thus, the pivot mechanisms and the vertical and lateral damping mechanisms cause the secondary seat cushion frame and the secondary seat back frame to rotate in the direction of the force and in phase with one another. As used herein, the term "in phase" describes two objects, for example, the secondary seat cushion frame and the secondary seat back frame, moving synchronously with one another in the same direction. As such, the term "out of phase" as used herein describes two objects, for example, the secondary seat cushion frame and the secondary seat back frame, not moving synchronously and in the same direction with one another. Further, it should be understood that when two objects are moving in phase with one another, the directions in which those object are moving are similarly in phase with one another.

In some embodiments, the upper pivot mechanism and the damping mechanisms are adjustable, either manually or electronically, in order to increase or decrease the amount of movement of the secondary seat cushion frame and/or the secondary seat back frame.

In some embodiments, the vehicle includes a display unit and a user interface. The vehicle also includes an onboard computing device including an electronic control unit having a processor and a memory component. Thus, the pivot mechanisms and the damping mechanisms may be operable by an occupant of the vehicle by operating controls on the user interface. In some embodiments, the electronic control unit also includes a network interface hardware configured to interface with a transceiver to connect to a network. The network couples the vehicle to a mobile computing device in order to allow an occupant to control the pivot mechanisms and the damping mechanisms wirelessly.

As used herein, the term "vehicle longitudinal direction" refers to the forward-rearward direction of the vehicle (i.e., in the +/− vehicle X direction depicted in FIG. 1). The term "vehicle lateral direction" refers to the cross-vehicle direction (i.e., in the +/− vehicle Y direction depicted in FIG. 1), and is transverse to the vehicle longitudinal direction. The term "vehicle vertical direction" refers to the upward-downward direction of the vehicle (i.e., in the +/− vehicle Z direction depicted in FIG. 1). As used herein, "upper" and "above" are defined as the positive Z direction of the coordinate axis shown in the drawings. As used herein, "lower" and "below" are defined as the negative Z direction of the coordinate axis shown in the drawings. Further, the term "outboard" or "outward" as used herein refers to the relative location of a component with respect to a vehicle centerline. The term "inboard" or "inward" as used herein refers to the relative location of a component with respect to the vehicle centerline. Because the vehicle structures may be generally symmetrical about the vehicle centerline, the direction to which use of terms "inboard," "inward," "outboard," and "outward" refer may be mirrored about the vehicle centerline when evaluating components positioned along opposite sides of the vehicle.

As used herein, the term "kinetic seat vertical direction" refers to the same direction as the vehicle vertical direction. In a configuration in which the kinetic seat assembly is a normal, front-facing seat in a vehicle, the term "kinetic seat longitudinal direction" refers to a direction parallel to the vehicle longitudinal direction. However, it should be appreciated that other configurations are contemplated in which the kinetic seat assembly is oriented in a direction in which the kinetic seat longitudinal direction is perpendicular, i.e., parallel to the vehicle lateral direction, or some other direction therebetween.

Also used herein, it is to be understood that the "turning direction" means a direction in which the occupant is turning the vehicle. Similarly, "counter-turning direction" means a direction opposite the turning direction.

Reference will now be made in detail to various embodiments of the kinetic seat assembly described herein, examples of which are illustrated in the accompanying drawings. Whenever possible, the same reference numerals will be used throughout the drawings to refer to the same or like parts.

Referring to FIG. 1, a vehicle is generally illustrated at 12. The vehicle 12 includes a passenger compartment 14 provided in an interior thereof. The passenger compartment 14 is a portion of an interior of the vehicle 12 which passengers or other occupants occupy. A plurality of vehicle seats including a driver seat 16, front passenger seat (not shown), and one or more rear passenger seats 18, such as second row passenger seats or third row passenger seats, are provided within the passenger compartment 14 of the vehicle 12.

In FIG. 1, the driver seat 16 is provided as a kinetic seat assembly 10. However, the kinetic seat assembly 10 is not limited to the driver seat 16. In embodiments, any one or any combination of the driver seat 16, the passenger seat, and the one or more rear passenger seats 18 may be provided as the kinetic seat assembly 10.

In FIG. 1, the vehicle 12 is provided as an automobile which includes coupes, sedans, minivans, trucks, crossovers, hybrids, and sports utility vehicles. However, the kinetic seat assembly 10 is not limited to automobiles. In embodiments, the kinetic seat assembly 10 may be provided in any vehicle 12 such as a watercraft, aircraft, or the like.

The vehicle 12 includes a steering wheel 20 located in front of the driver seat 16 in the vehicle longitudinal direction. The vehicle 12 includes a display unit 22 and a user interface 24. In some embodiments, the user interface 24 includes manual buttons or touchscreen controls provided on the display unit 22. It is appreciated, that the vehicle 12 in which the kinetic seat assembly 10 is provided may be an autonomous vehicle in which no steering wheel 20 is provided.

The vehicle 12 includes an onboard computing device 26. In some embodiments, a network 28 couples the vehicle 12 to a mobile computing device 30. The network 28 may include a wide area network, such as an internet or cellular network (such as 3G, 4G, 4G LTE, WiMAX, etc.). Similarly, the network 28 may include a local area network, such as a wireless fidelity (Wi-Fi) network, a Bluetooth network, a near field communication network, hardware, and the like.

The onboard computing device 26 of the vehicle 12 includes an electronic control unit 32. In some embodiments, the onboard computing device 26 includes a transceiver 34 in electrical communication with the electronic control unit 32 and configured for two way communication with the network 28 to couple the vehicle 12 to the network 28 and, thus, the mobile computing device 30.

The mobile computing device 30 may be configured as a mobile phone, a tablet, a personal computer, and/or other devices for performing the functionality described herein. The mobile computing device 30 may be operated by a third party such as a driver or other occupant or owner of the vehicle 12.

Still referring to FIG. 1, the electronic control unit 32 includes a local interface 36, a processor 38, an input/output hardware 40, a data storage component 42, and a memory component 44 coupled to the processor 38.

The local interface 36 is implemented as a bus or other communication interface to facilitate communication among the components of the electronic control unit 32. The local interface 36 is formed from any medium that is configured to transmit a signal. As non-limiting examples, the local interface 36 is formed of conductive wires, conductive traces, optical waveguides, or the like. The local interface 36 may also refer to the expanse in which electromagnetic radiation and their corresponding electromagnetic waves traverses. Moreover, the local interface 36 may be formed from a combination of mediums configured to transmit signals. In one embodiment, the local interface 36 comprises a combination of conductive traces, conductive wires, connectors, and buses that cooperate to permit the transmission of electrical data signals to and from the various components of the mobile computing device 30. Additionally, it is noted that the term "signal" means a waveform (e.g., electrical, optical, magnetic, mechanical or electromagnetic) configured to travel through a medium, such as DC, AC, sinusoidal-wave, triangular-wave, square-wave, vibration, and the like.

The processor 38 may include processing components operable to receive and execute machine-readable instructions, such as those stored in the data storage component 42 and/or the memory component 44. As a non-limiting example, the processor 38 may be one of a shared processor circuit, dedicated processor circuit, or group processor circuit.

The input/output hardware 40 may refer to a basic input/output system (BIOS) that interacts with hardware of the vehicle 12, the mobile computing device 30, drivers that interact with particular devices of the vehicle 12 or the mobile computing device 30, one or more operating systems, user applications, background services, background applications, etc. In some embodiments, the input/output hardware 40 includes the display unit 22, the user interface 24, and/or the other hardware in the vehicle 12.

The data storage component 42 is communicatively coupled to the processor 38. As a non-limiting example, the data storage component 42 may include one or more database servers that support NoSQL, MySQL, Oracle, SQL Server, NewSQL, or the like. The data storage component 42 stores user-specific parameters and characteristics for desired operating modes of the kinetic seat assembly 10.

The memory component 44 is communicatively coupled to the processor 38. As a non-limiting example, the memory component 44 may be one of a shared memory circuit, dedicated memory circuit, or group memory circuit. The memory component 44 stores detection logic 46 and communication logic 48. The detection logic 46 and the communication logic 48 may each include a plurality of different pieces of logic, each of which may be embodied as a computer program, firmware, and/or software/hardware.

The detection logic 46 is executable by the processor 38 to detect one or more signals provided by the input/output hardware 40, such as the user interface 24. The communication logic 48 is executable by the processor 38 to cause the onboard computing device 26 to execute commands and operations corresponding to the detection logic 46. In some embodiments, the detection logic 46 and the communication logic 48 communicate with the network 28 through a network interface hardware 50 and/or the transceiver 34 to communicate with the mobile computing device 30.

In some embodiments, the memory component 44 is configured as volatile and/or nonvolatile memory and, as such, may include random access memory (SRAM, DRAM, and/or other types of RAM), flash memory, secure digital (SD) memory, registers, compact discs, digital versatile discs (DVD), and/or other types of non-transitory computer readable mediums. Depending on the particular embodiments, these non-transitory computer readable mediums may reside within the onboard computing device 26 and/or external to the onboard computing device 26. The memory component 44 and the data storage component 42 operate as the memory unit of the electronic control unit 32.

As noted above, in some embodiments, the electronic control unit 32 includes a network interface hardware 50. The network interface hardware 50 may include or be configured to interface with the transceiver 34 to connect to the network 28. As an example, the network interface hardware 50 is operable to communicate with any wired or wireless network hardware, including an antenna, a modem, a LAN, wireless fidelity (Wi-Fi) card, WiMAX card, mobile communications hardware, and/or other hardware for communicating with other networks and/or devices. From this connection, communication is made through the transceiver 34 using the network interface hardware 50 thereby facilitating communication between the electronic control unit 32 and the mobile computing device 30 through the network 28.

It should be understood that while the components discussed above are illustrated as residing within the electronic control unit 32, this is merely an example thereof. In some embodiments, one or more of the components may reside external to the electronic control unit 32. It should also be understood that while the electronic control unit 32 is illustrated as a single device, this is also merely an example. In some embodiments, the detection logic 46 and the communication logic 48 may reside on different computing devices. As an example thereof, one or more of the functionalities and/or components described herein may be provided by the mobile computing device 30, which may be coupled to the vehicle 12 through the network 28.

Referring now to FIGS. 2-9, the kinetic seat assembly 10 is schematically shown and generally includes a primary seat cushion frame 52, a secondary seat cushion frame 54 pivotally connected to the primary seat cushion frame 52, a primary seat back frame 56, a secondary seat back frame 58 pivotally connected to the primary seat back frame 56, a vertical damping mechanism 100, a lateral damping mechanism 102, and a linkage assembly 60. As discussed in more detail herein, the vertical damping mechanism 100 and the lateral damping mechanism 102 provide a damping effect between the secondary seat cushion frame 54 and the secondary seat back frame 58 relative to the primary seat cushion frame 52 and the primary seat back frame 56.

As used herein, the term "damping effect" is referred to as a degree of compression. In embodiments, compression may be measured by a length of a biasing member, such as a spring, or resistance to compression by a fluid, such as oil. As such, a damping effect is directly correlated to an amount of travel between ends of the biasing member or resistance provided by the fluid.

Figure 3:
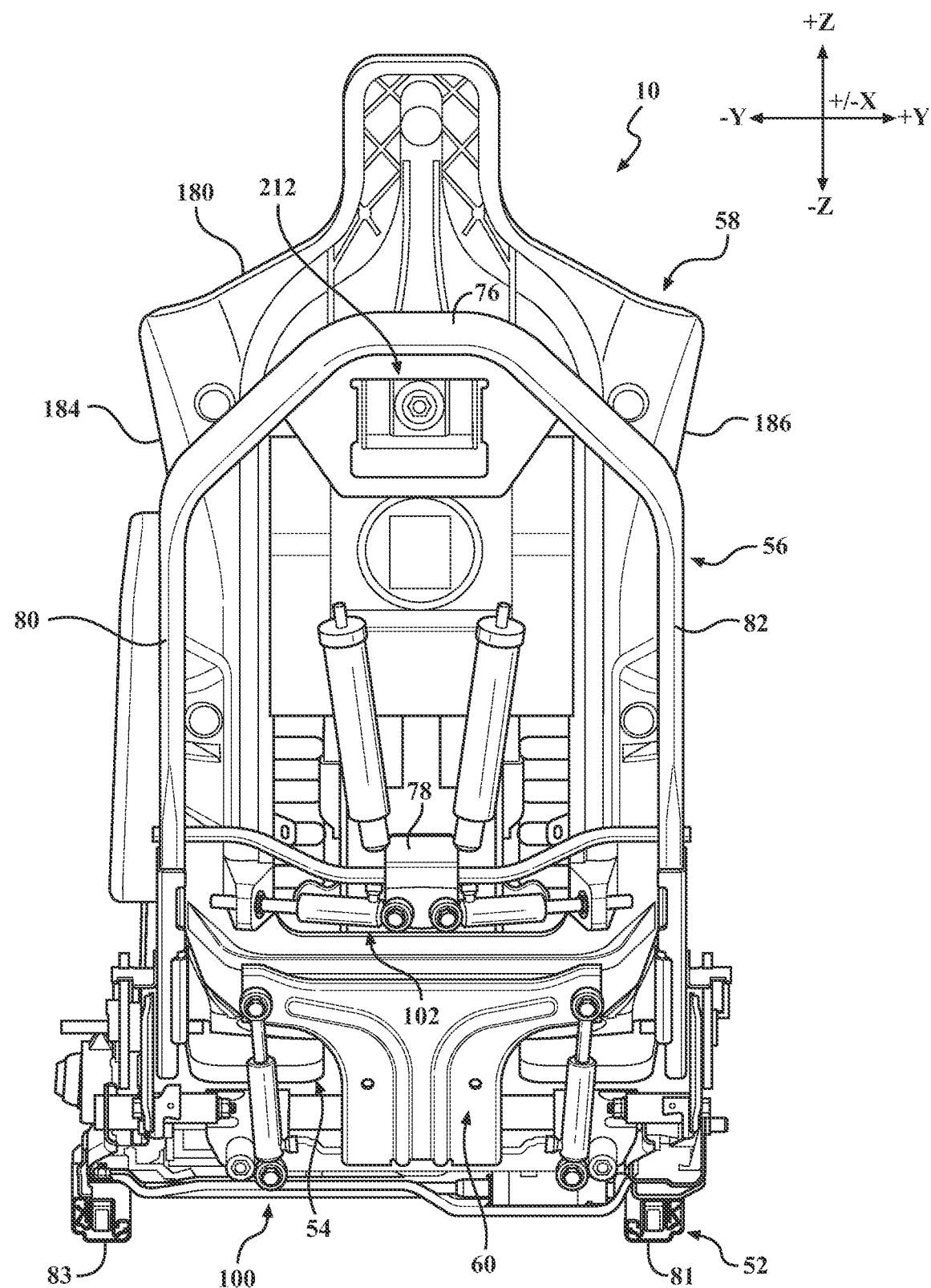
FIG. 3 schematically depicts a rear view of the kinetic seat assembly of FIG. 1, according to one or more embodiments shown and described herein.
Figure 4:
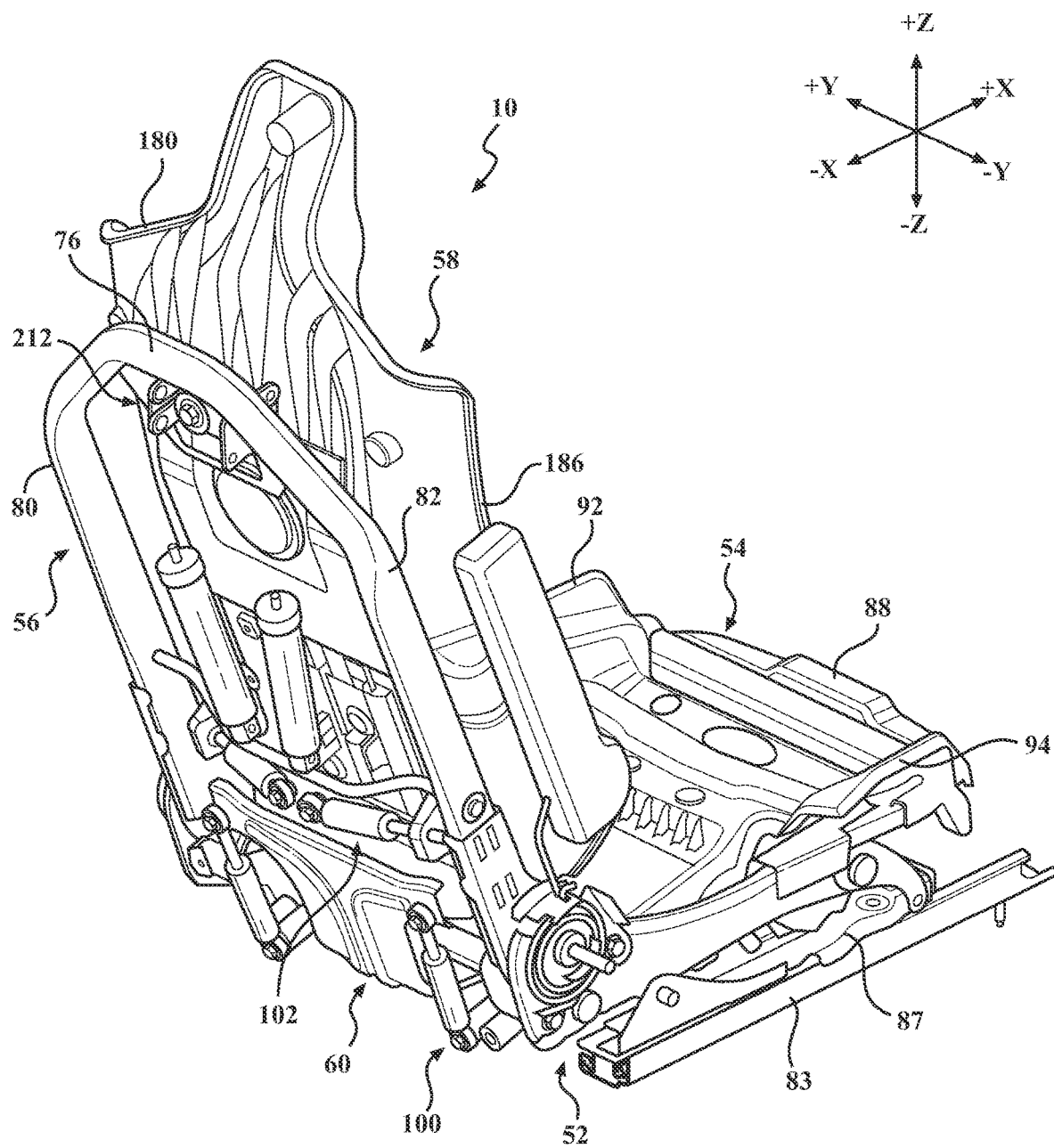
FIG. 4 schematically depicts a rear perspective view of the kinetic seat assembly of FIG. 1, according to one or more embodiments shown and described herein.
Figure 5:
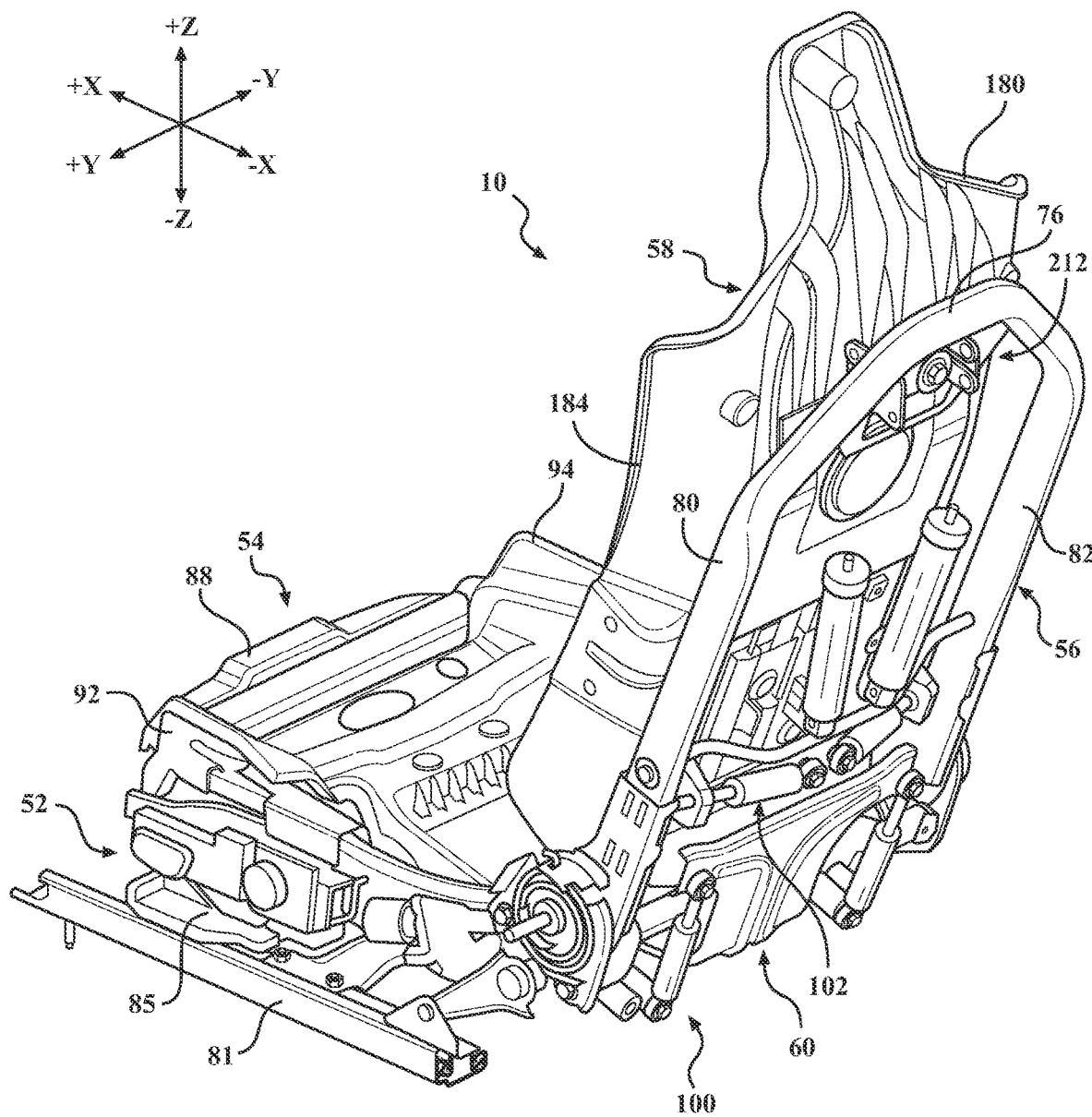
FIG. 5 schematically depicts another rear perspective view of the kinetic seat assembly of FIG. 1, according to one or more embodiments shown and described herein.
Figure 27:
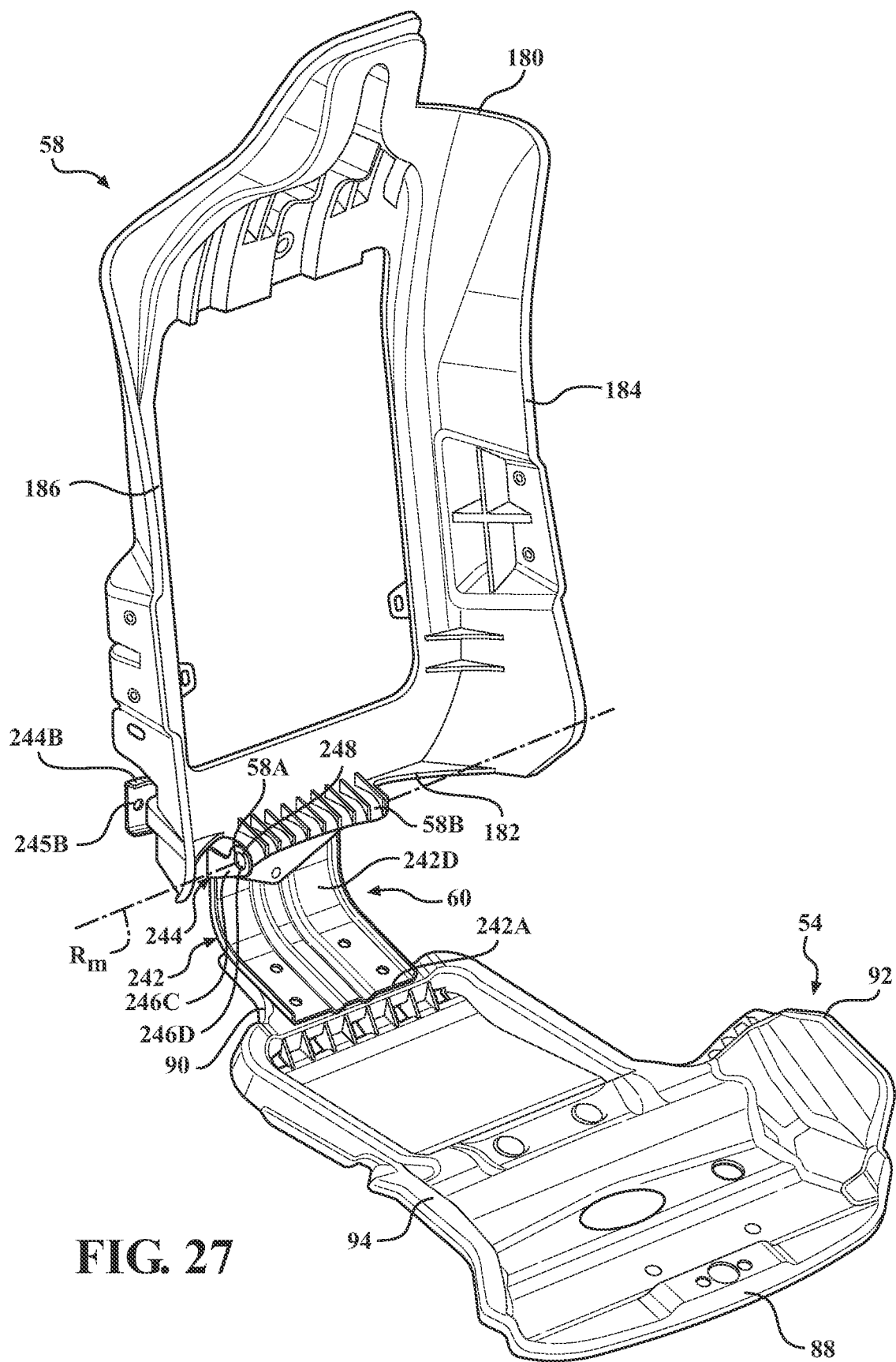
FIG. 27 schematically depicts a front perspective view of the secondary seat cushion frame of FIG. 23 mounted to the secondary seat back frame of FIG. 14, according to one or more embodiments shown and described herein.
Figure 28:
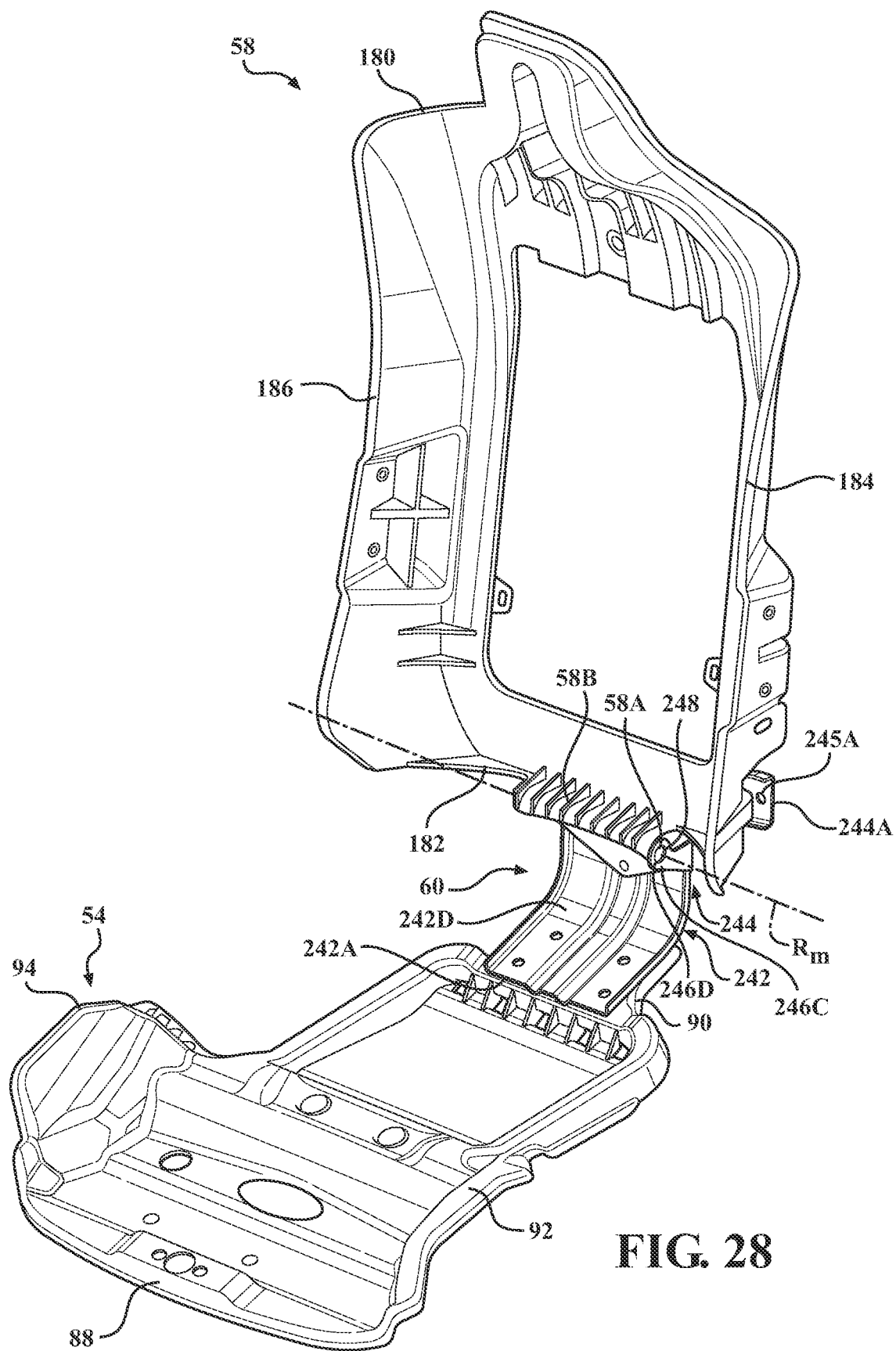
FIG. 28 schematically depicts another front perspective view of the secondary seat cushion frame of FIG. 23 mounted to the secondary seat back frame of FIG. 14, according to one or more embodiments shown and described herein.

As shown in FIGS. 3, 27, and 28, the linkage assembly 60 interconnects the secondary seat cushion frame 54 and the secondary seat back frame 58. The linkage assembly 60 is configured to inhibit the secondary seat cushion frame 54 and the secondary seat back frame 58 from moving out of phase with one another. It is to be understood that movement of the secondary seat cushion frame 54 and the secondary seat back frame 58 is caused by rotation of the occupant seated within the kinetic seat assembly 10 due to a force exhibited on the occupant and the vehicle 12 during driving. Thus, it should be appreciated that the movement of the secondary seat cushion frame 54 and the secondary seat back frame 58 is not a result of any motorized or otherwise electronically programmed and controlled operation. However, as discussed in more detail herein, the degree of movement may be controlled by an electronic program or controlled operation. Various embodiments of the kinetic seat assembly 10 and the operation of the kinetic seat assembly 10 will be described in more detail herein.

It should be appreciated that, as shown in FIG. 1, the secondary seat cushion frame 54 includes padding 11 to support a pelvis, such as a buttocks and thighs, of an occupant, and that the secondary seat back frame 58 includes padding 13 to support a back of the occupant. The padding 11, 13 on the secondary seat cushion frame 54 and the secondary seat back frame 58 are omitted in the remaining figures to better illustrate the embodiments.

Figure 6:
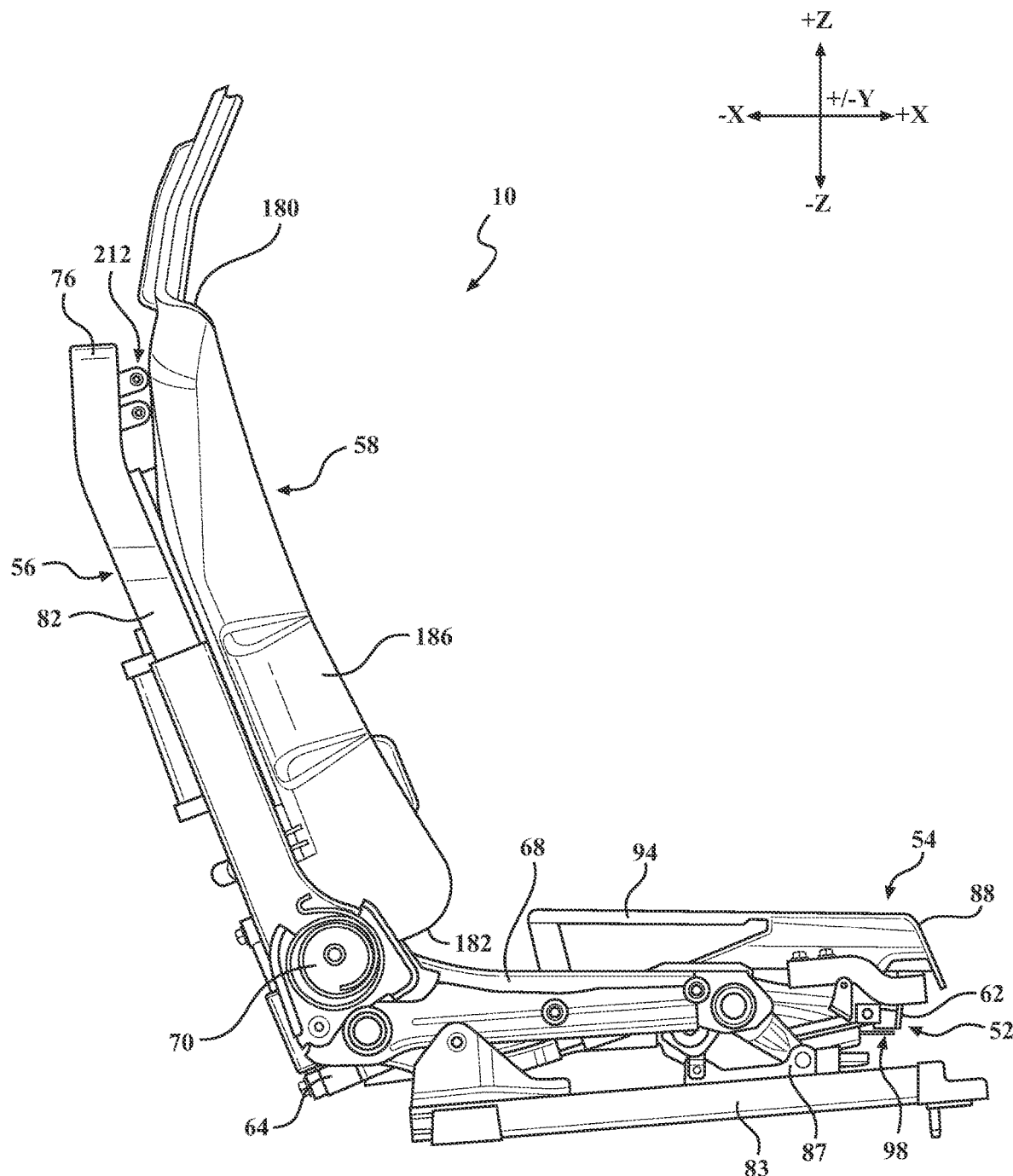
FIG. 6 schematically depicts a first side view of the kinetic seat assembly of FIG. 1, according to one or more embodiments shown and described herein.
Figure 7:
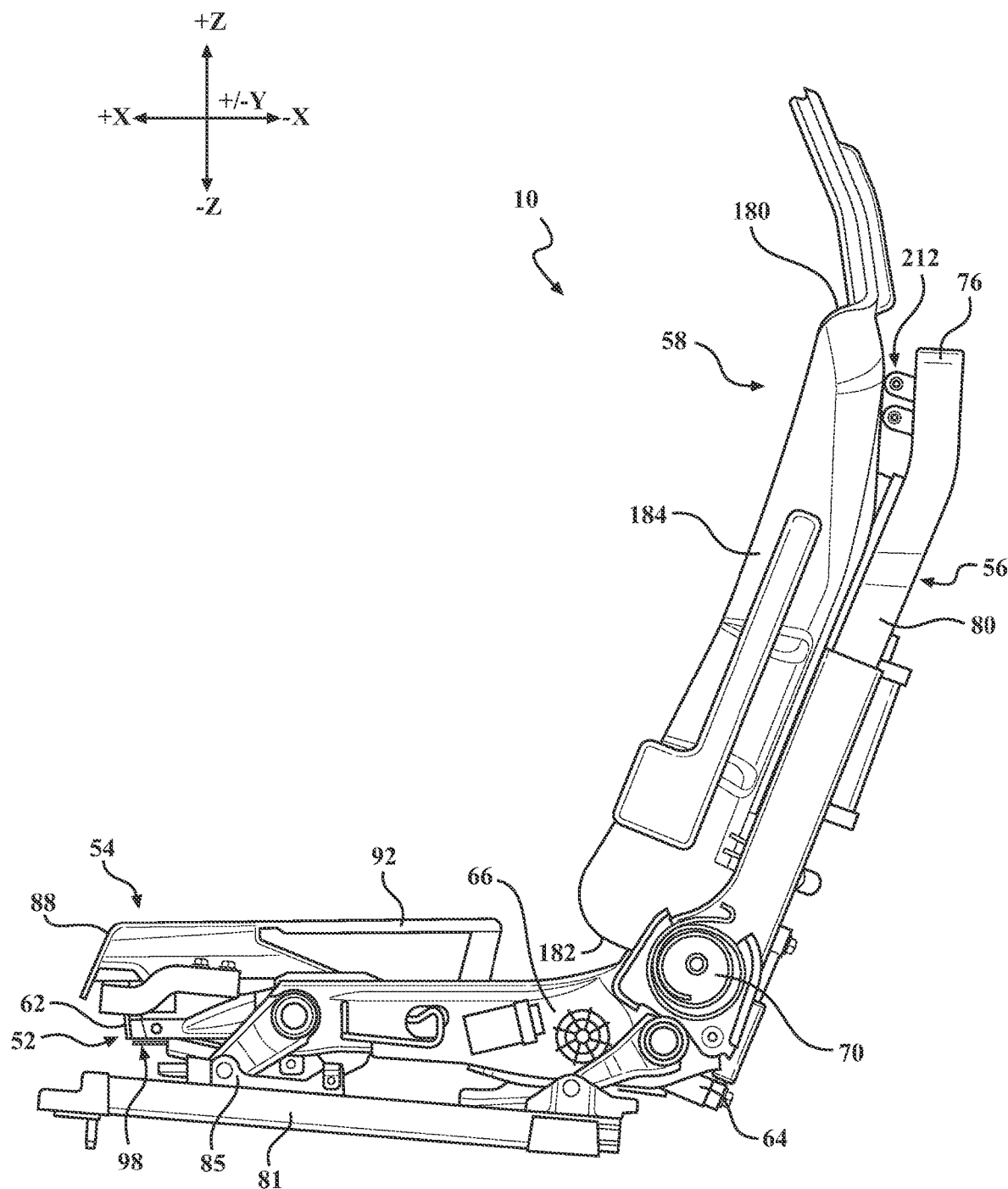
FIG. 7 schematically depicts a second side view of the kinetic seat assembly of FIG. 1, according to one or more embodiments shown and described herein.
Figure 9:
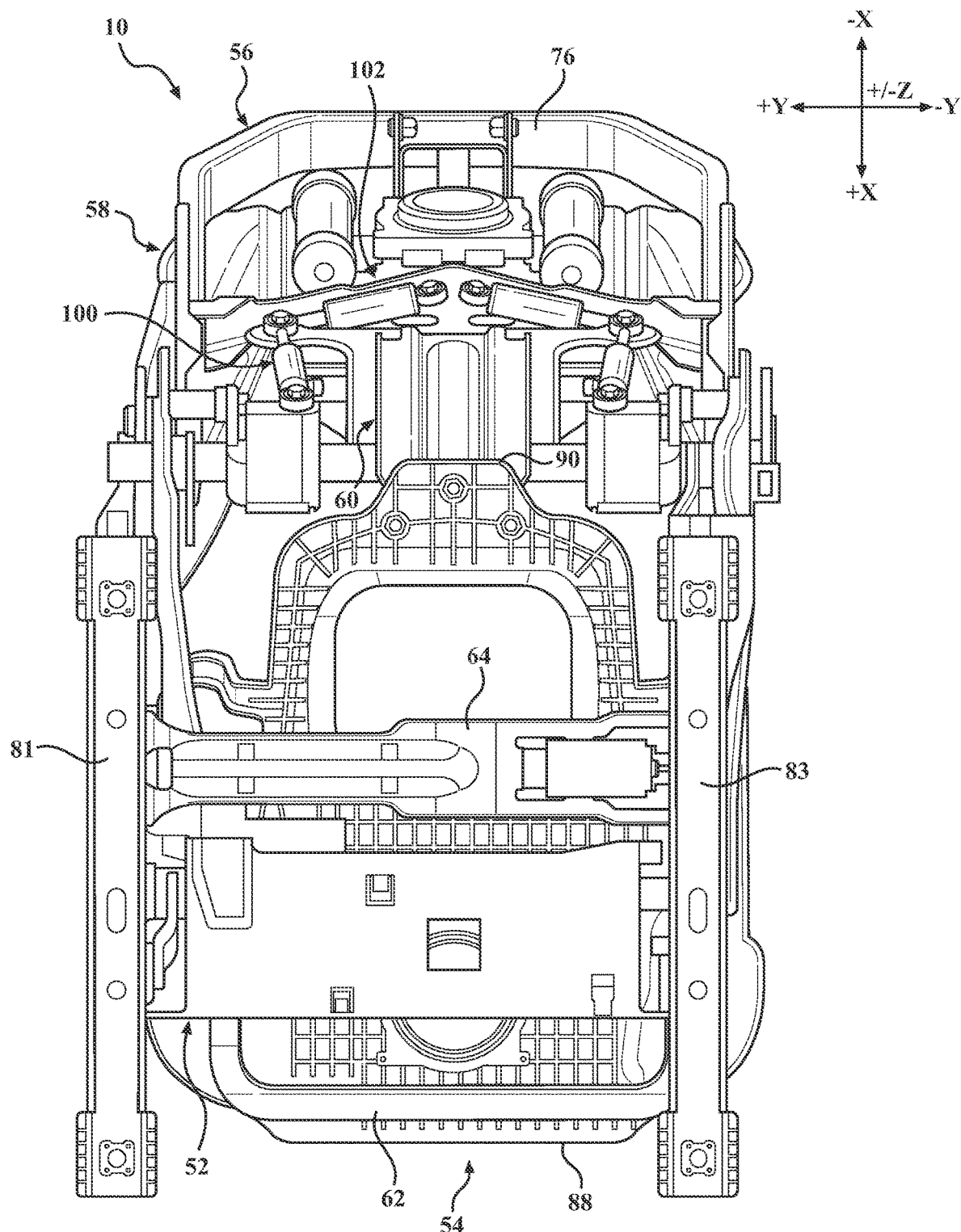
FIG. 9 schematically depicts a bottom view of the kinetic seat assembly of FIG. 1, according to one or more embodiments shown and described herein.
Figure 11:
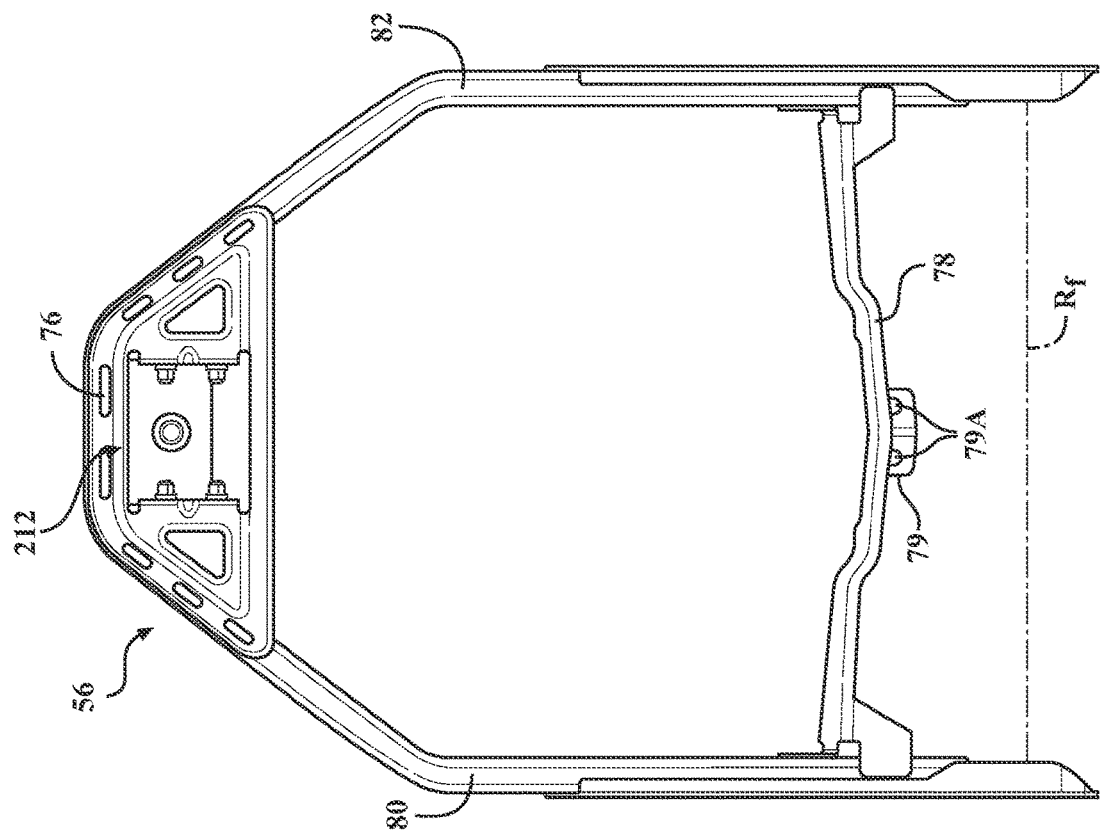
FIG. 11 schematically depicts a rear view of the primary seat back frame of FIG. 10, according to one or more embodiments shown and described herein.
Figure 10:
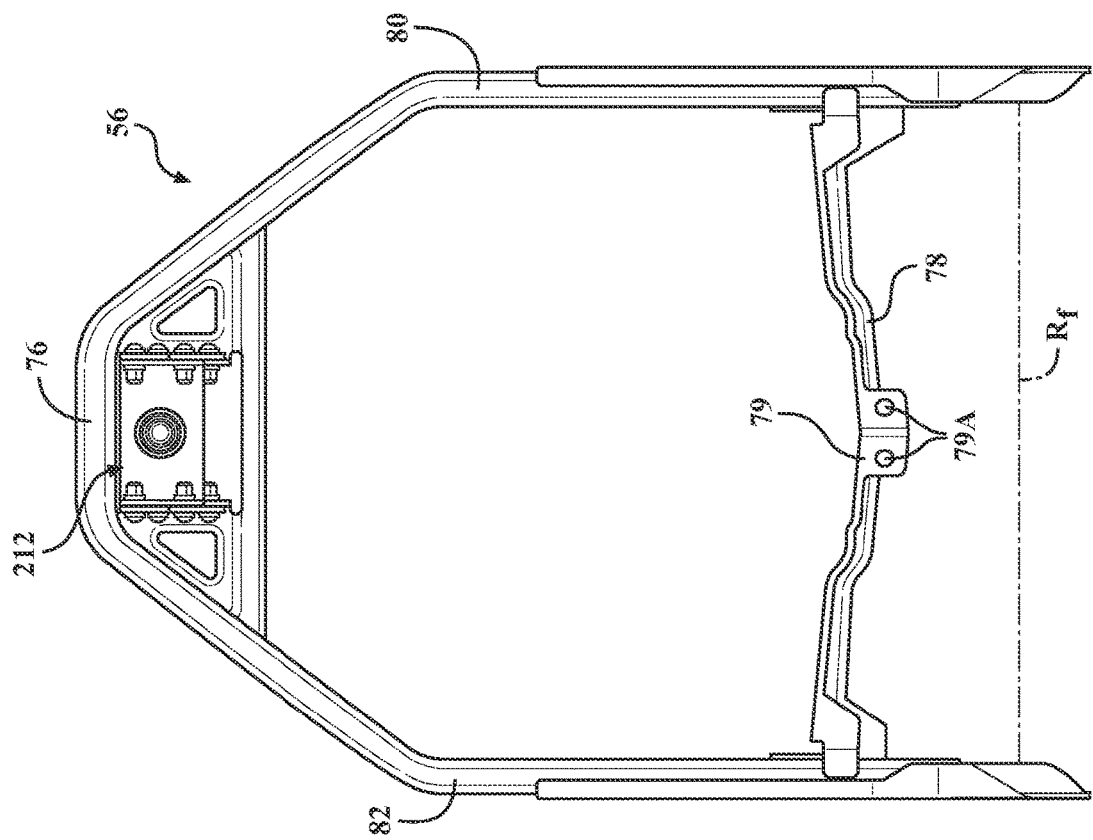
FIG. 10 schematically depicts a front view of a primary seat back frame of the kinetic seat assembly of FIG. 1, according to one or more embodiments shown and described herein.
Figure 12:
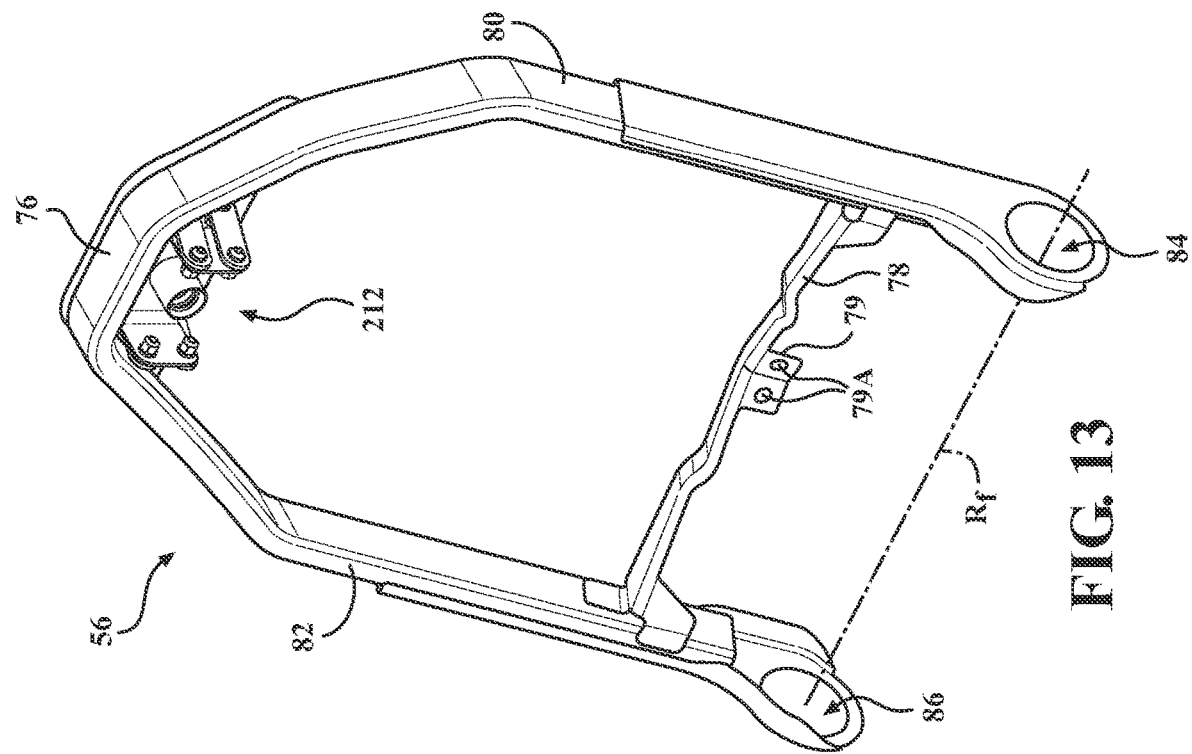
FIG. 12 schematically depicts a front perspective view of the primary seat back frame of FIG. 10, according to one or more embodiments shown and described herein.
Figure 13:
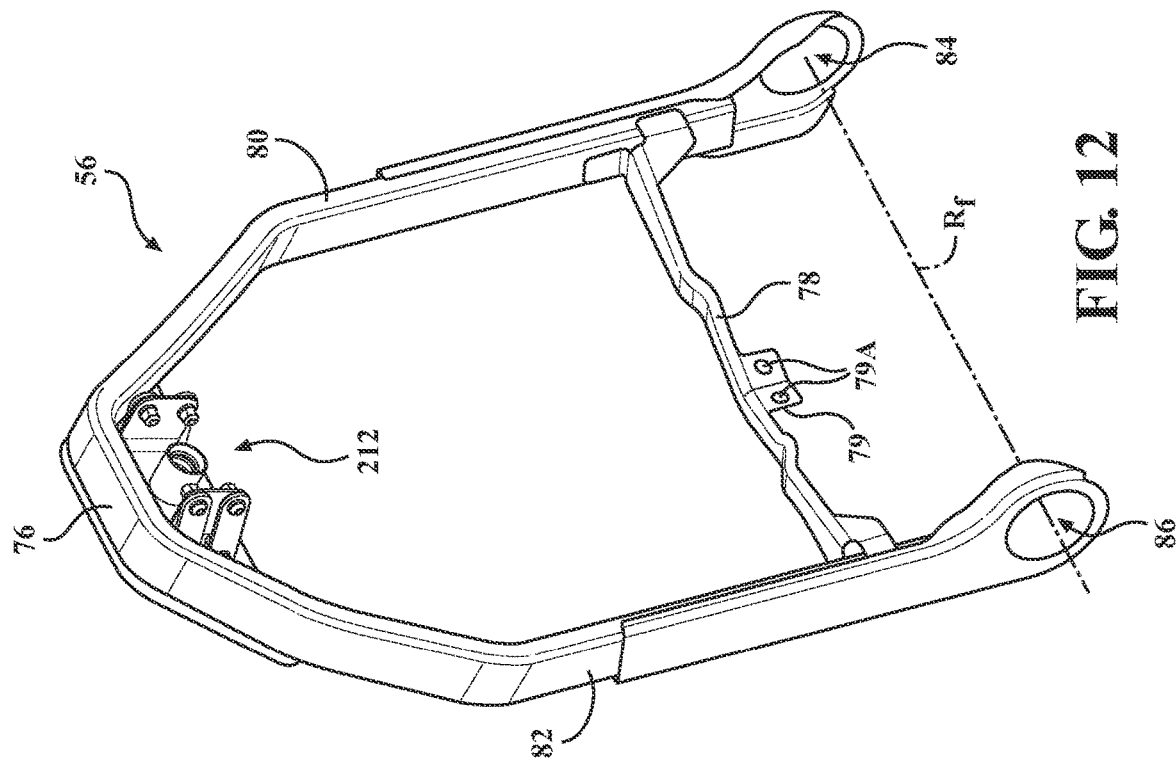
FIG. 13 schematically depicts another front perspective view of the primary seat back frame of FIG. 10, according to one or more embodiments shown and described herein.

Referring to FIGS. 6, 7, and 9, the primary seat cushion frame 52 may have a generally rectangular shape. The primary seat cushion frame 52 includes a front member 62 provided proximate a front portion thereof and a rear member 64 provided proximate a rear portion thereof. The rear member 64 traverses between a pair of opposing side members 66, 68. The primary seat cushion frame 52 may also include a pair of recliner mechanisms 70 provided on opposite sides of the primary seat cushion frame 52, proximate the rear member 64. The primary seat cushion frame 52 may include a pair of rails 81, 83 for slidably engaging a pair of tracks 85, 87 mounted to a floor F of the passenger compartment 14 of the vehicle 12. Sliding the pair of rails 81, 83 along the tracks 85, 87 allows the occupant to move the kinetic seat assembly 10 forward or backward in the vehicle longitudinal direction in order to comfortably position the kinetic seat assembly 10 and the occupant with respect to the steering wheel 20 of the vehicle 12. In addition, it should be appreciated that the primary seat cushion frame 52 may move in a kinetic seat vertical direction so as to be lowered or raise relative to the floor F.

Referring now to FIGS. 10-13, the primary seat back frame 56 may have a generally trapezoidal shape. The primary seat back frame 56 includes an upper member 76 provided proximate an upper portion thereof and a lower member 78 provided proximate a lower portion thereof. The lower member 78 traverses between a pair of opposing side members 80, 82. The lower member 78 includes a lower plate 79 extending therefrom. The lower plate 79 is provided at a substantially center location between the side members 80, 82. A pair of holes 79A are formed in the lower plate 79.

As described in more detail herein, the pair of holes 79A are provided to facilitate coupling a lateral damping mechanism 102 to the primary seat back frame 56. The primary seat back frame 56 also includes a pair of openings 84, 86 formed in the side members 80, 82 of the primary seat back frame 56, proximate the lower member 78. The recliner mechanisms 70 in the primary seat cushion frame 52 engage the pair of openings 84, 86 formed in the primary seat back frame 56 in order to allow the primary seat back frame 56 to rotate about a reclining axis Rf with respect to the primary seat cushion frame 52.

In other embodiments of the kinetic seat assembly 10, the pair of openings 84, 86 are instead formed in the primary seat cushion frame 52 and the pair of recliner mechanisms 70 are provided on the primary seat back frame 56. In some embodiments, both the primary seat cushion frame 52 and the primary seat back frame 56 have mating recliner mechanisms, such as corresponding female and male recliner mechanisms, that engage with one another to facilitate rotation of the primary seat back frame 56 about the reclining axis Rf with respect to the primary seat cushion frame 52.

Figure 8:
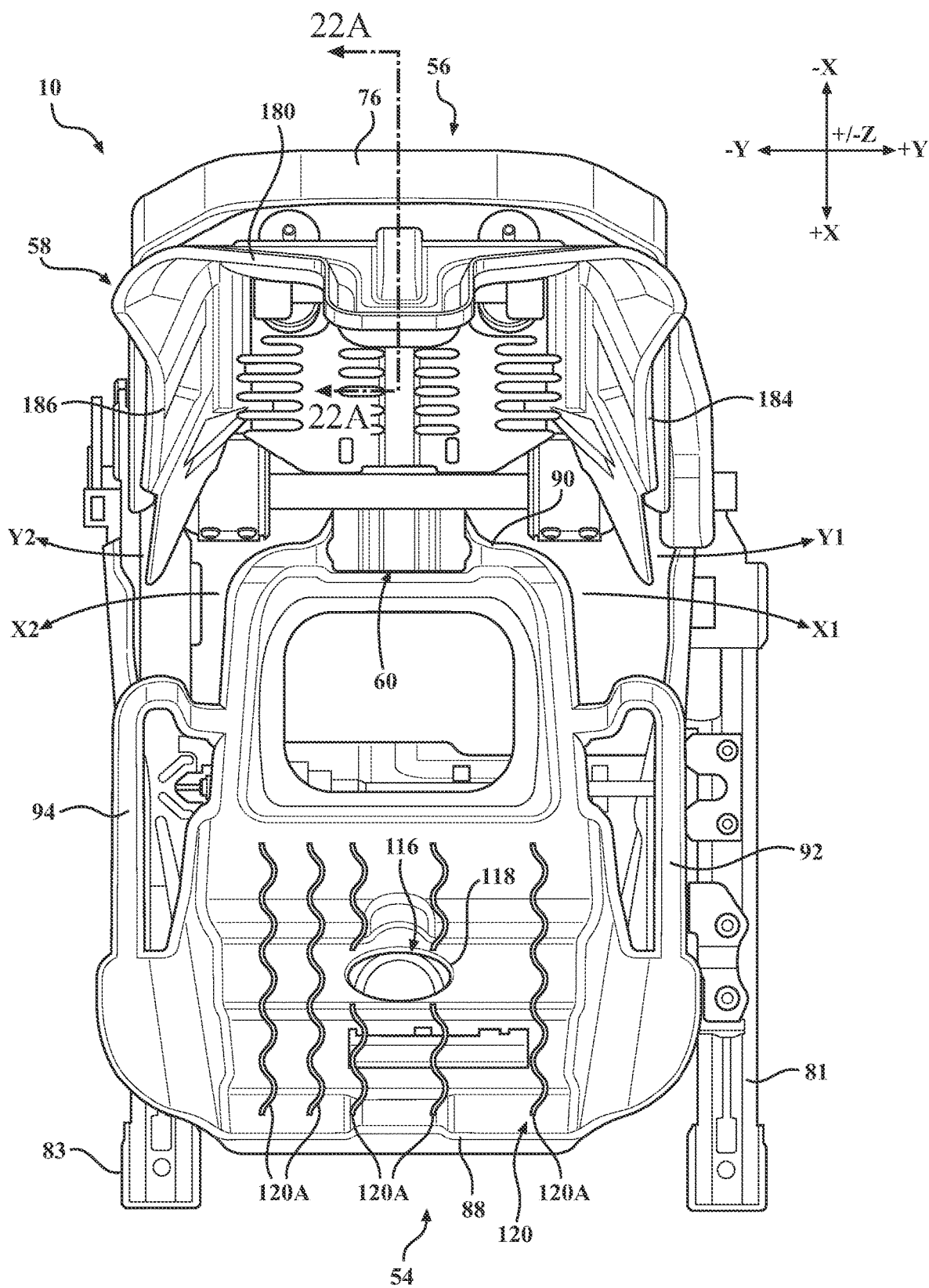
FIG. 8 schematically depicts a top view of the kinetic seat assembly of FIG. 1, according to one or more embodiments shown and described herein.
Figure 23:
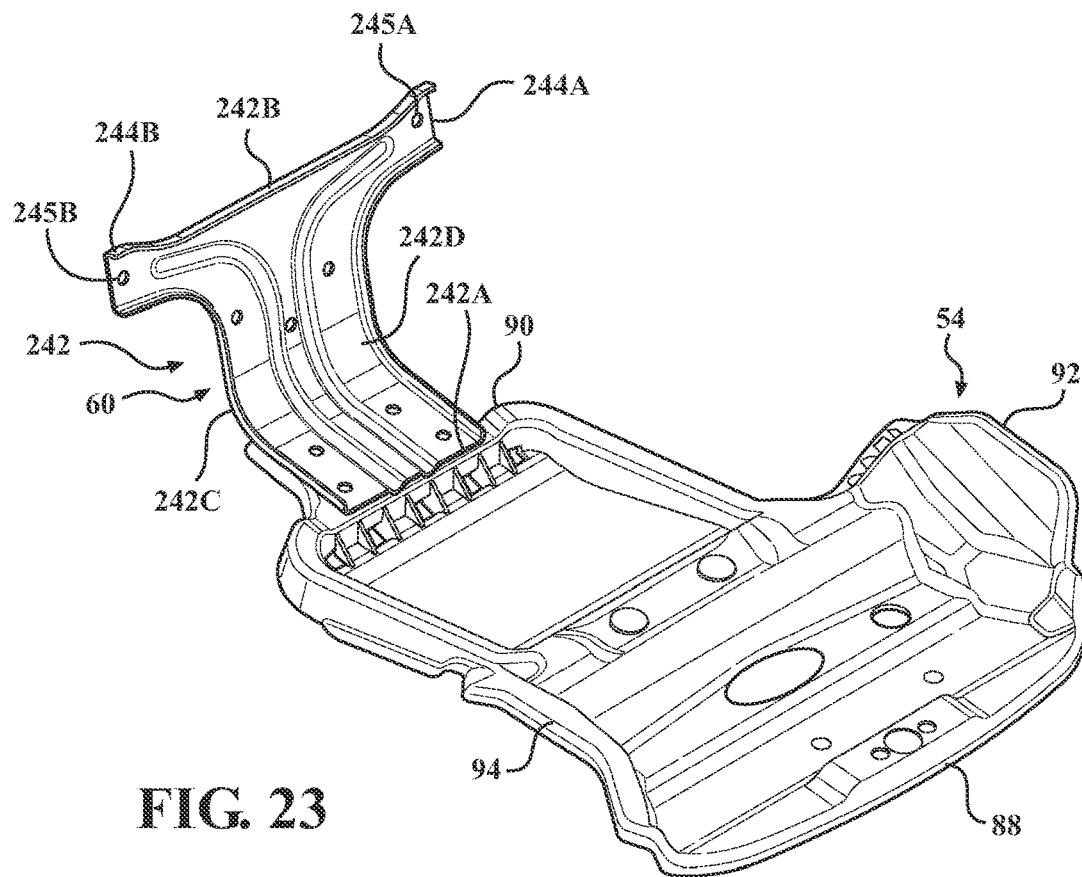
FIG. 23 schematically depicts a top perspective view of a secondary seat cushion frame of the kinetic seat assembly of FIG. 1, according to one or more embodiments shown and described herein.
Figure 24:
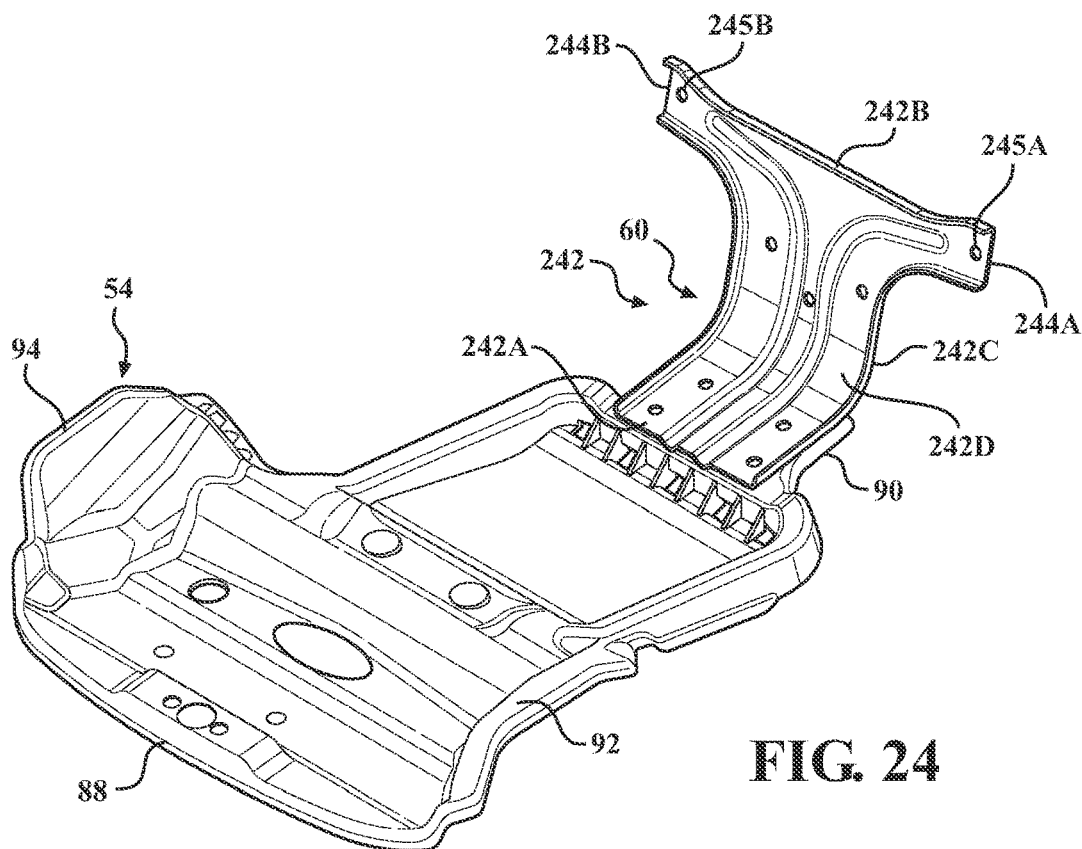
FIG. 24 schematically depicts another top perspective view of the secondary seat cushion frame of FIG. 23, according to one or more embodiments shown and described herein.

Referring now to FIGS. 8, 23, and 24, the secondary seat cushion frame 54 has a shape contoured to conform to the pelvis of the occupant to provide sufficient support when seated in the kinetic seat assembly 10. As such, the secondary seat cushion frame 54 includes a front end 88 provided proximate a front portion thereof, a rear end 90 provided proximate a rear portion thereof, and a pair of side ends 92, 94 interconnecting the front end 88 and the rear end 90.

As shown in FIGS. 6 and 7, the secondary seat cushion frame 54 is suspended above the primary seat cushion frame 52 at a front pivot mechanism 98 to facilitate pivoting and rotation of the secondary seat cushion frame 54 with respect to the primary seat cushion frame 52. More specifically, the front pivot mechanism 98 permits the secondary seat cushion frame 54 to rotate relative to the primary seat cushion frame 52 in a kinetic seat lateral direction as a force is applied in an opposite kinetic seat lateral direction to a person sitting in the kinetic seat assembly 10. The front pivot mechanism 98 is provided proximate the front portion of the secondary seat cushion frame 54 to facilitate the greatest degree of rotation. Thus, the front end 88 of the secondary seat cushion frame 54 is suspended above the front member 62 of the primary seat cushion frame 52 by the front pivot mechanism 98.

Figure 16:
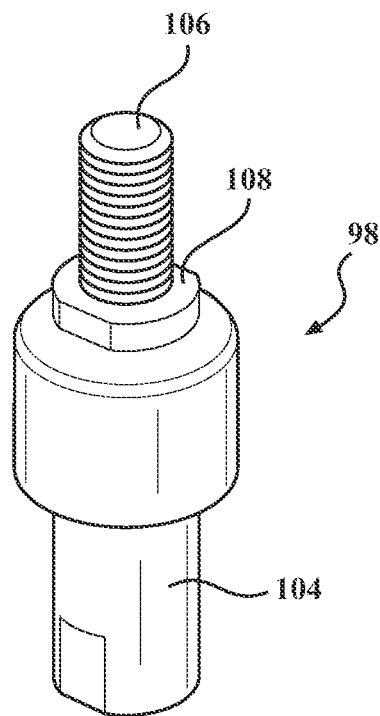
FIG. 16 schematically depicts a perspective view of a front pivot mechanism of the kinetic seat assembly of FIG. 1, according to one or more embodiments shown and described herein.

The front pivot mechanism 98 is disposed between the primary seat cushion frame 52 and the secondary seat cushion frame 54 proximate front portions thereof in order to suspend the secondary seat cushion frame 54 above the primary seat cushion frame 52. As shown in greater detail in FIG. 16, the front pivot mechanism 98 may include a lower front pivot mechanism portion 104 fixed to one of the primary seat cushion frame 52 and the secondary seat cushion frame 54 and an upper front pivot mechanism portion 106 fixed to the other of the primary seat cushion frame 52 and the secondary seat cushion frame 54. The upper front pivot mechanism portion 106 includes a ball joint 108 received within an end of the lower front pivot mechanism portion 104. In embodiments, the ball joint 108 may be provided on the lower front pivot mechanism portion 104, which is received within an end of the upper front pivot mechanism portion 106.

Referring now to FIGS. 8 and 9, in embodiments, the secondary seat cushion frame 54 may also include heating and cooling mechanisms for adjusting a temperature of a surface of the secondary seat cushion frame 54. More particularly, the secondary seat cushion frame 54 may include a cooling mechanism 116 for cooling a surface of the secondary seat cushion frame 54. The cooling mechanism 116 may include, for example, a fan or an air conditioning device. A hole 118 may be formed in the secondary seat cushion frame 54 such that air delivered by the cooling mechanism 116 may pass through the secondary seat cushion frame 54, thereby cooling the occupant seated therein. The cooling mechanism 116 is electronically connected to the electronic control unit 32, which, upon receiving a signal such as from the user interface 24 or a control device on the kinetic seat assembly 10, sends a signal to the cooling mechanism 116 to adjust the parameters of the cooling mechanism 116 accordingly such as, for example, a temperature or blowing speed of the cooling mechanism 116.

Referring still to FIG. 8, the secondary seat cushion frame 54 may include a heating mechanism 120 for heating a surface of the secondary seat cushion frame 54. The heating mechanism 120 may include one or more heating coils 120A arranged on the secondary seat cushion frame 54. In some embodiments, the heating coils 120A of the heating mechanism 120 are positioned between the secondary seat cushion frame 54 and the padding 11. In other embodiments, the heating coils 120A may be provided in the secondary seat cushion frame 54 itself. In embodiments, the heating mechanism 120 may include a plurality of separate heating coils 120A arranged parallel to one another extending in the kinetic seat longitudinal direction along an upward-facing surface of the secondary seat cushion frame 54. In other embodiments, the heating mechanism 120 may include a single heating coil 120A formed in a sinusoidal arrangement provided along the upward-facing surface of the secondary seat cushion frame 54. The heating mechanism 120 is electronically connected to the electronic control unit 32, which, upon receiving a signal such as from the user interface 24 or a control device on the kinetic seat assembly 10, sends a signal to the heating mechanism 120 to adjust the parameters of the heating mechanism 120 accordingly such as, for example, a temperature of the heating mechanism 120.

Figure 14:
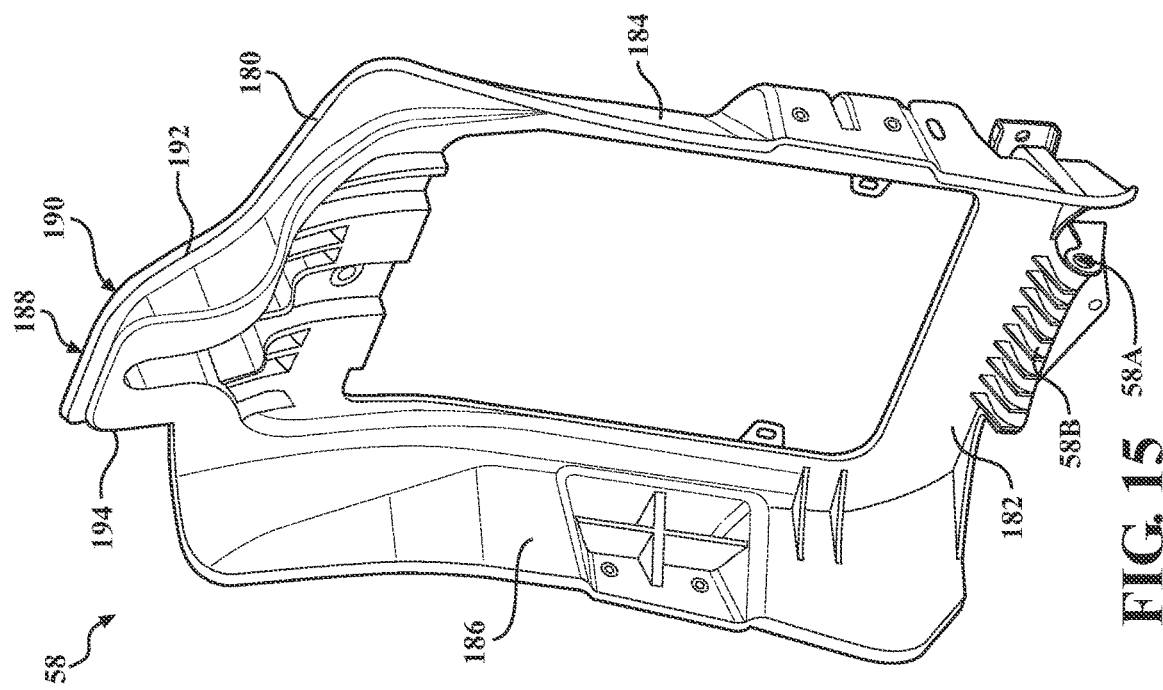
FIG. 14 schematically depicts a front perspective view of a secondary seat back frame of the kinetic seat assembly of FIG. 1, according to one or more embodiments shown and described herein.
Figure 15:
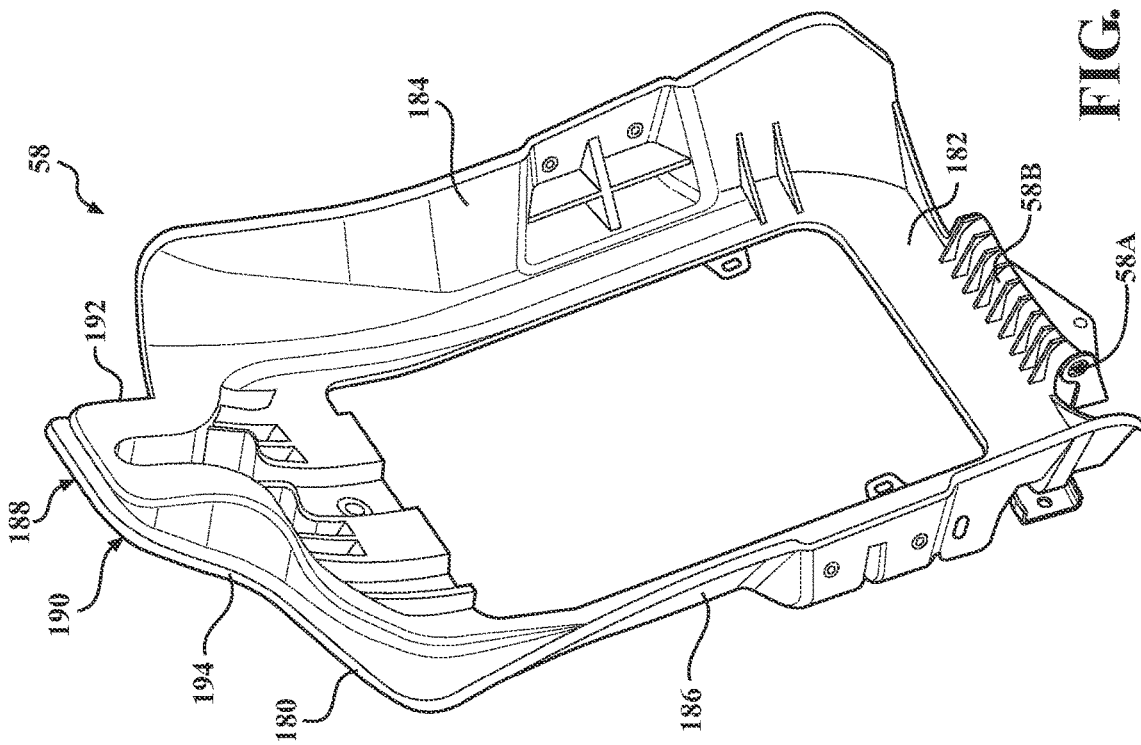
FIG. 15 schematically depicts another front perspective view of the secondary seat back frame of FIG. 14, according to one or more embodiments shown and described herein.

Referring to FIGS. 14 and 15 and with respect now to the secondary seat back frame 58, the secondary seat back frame 58 has a shape contoured to conform to the torso of the occupant to provide sufficient support. As such, the secondary seat back frame 58 includes an upper end 180 provided proximate an upper portion thereof, a lower end 182 provided proximate a lower portion thereof, and a pair of side ends 184, 186 interconnecting the upper end 180 and the lower end 182. The upper end 180 may include a head rest 188 integrally formed with and extending upwardly from the upper end 180 in order to provide additional support to the head and neck of the occupant. In some embodiments, a head support frame 190 is provided and extends upwardly from the side ends 184, 186 of the secondary seat back frame 58. The head support frame 190 is a generally inverted U-shaped member including a pair of arms 192, 194 connected to the side ends 184, 186 of the secondary seat back frame 58. As discussed in more detail below, an upper pivot mechanism 212 is coupled to the secondary seat back frame 58 below the head support frame 190.

As shown in FIGS. 6 and 7, the secondary seat back frame 58 is suspended in front of the primary seat back frame 56 at the upper pivot mechanism 212 to facilitate pivoting and rotation of the secondary seat back frame 58 with respect to the primary seat back frame 56. The upper pivot mechanism 212 is positioned proximate the upper end 180 of the secondary seat back frame 58 to facilitate the greatest degree of rotation. Thus, the upper end 180 of the secondary seat back frame 58 is suspended in front of the upper member 76 of the primary seat back frame 56 by the upper pivot mechanism 212, described in more detail herein.

Referring again to FIG. 2, in embodiments, the secondary seat back frame 58 may also include heating and cooling mechanisms for adjusting a temperature of a surface of the secondary seat back frame 58. More particularly, the secondary seat back frame 58 may include a cooling mechanism 140 for cooling a surface of the secondary seat back frame 58. The cooling mechanism 140 may include, for example, a fan. A hole 142 may be formed in the secondary seat back frame 58 such that air delivered by the cooling mechanism 140 may pass through the secondary seat back frame 58, thereby cooling the occupant seated therein. The cooling mechanism 140 is electronically connected to the electronic control unit 32, which, upon receiving a signal such as from the user interface 24 or a control device on the kinetic seat assembly 10, sends a signal to the cooling mechanism 140 to adjust the parameters of the cooling mechanism 140 accordingly such as, for example, a temperature or blowing speed of the cooling mechanism 140.

Figure 2:
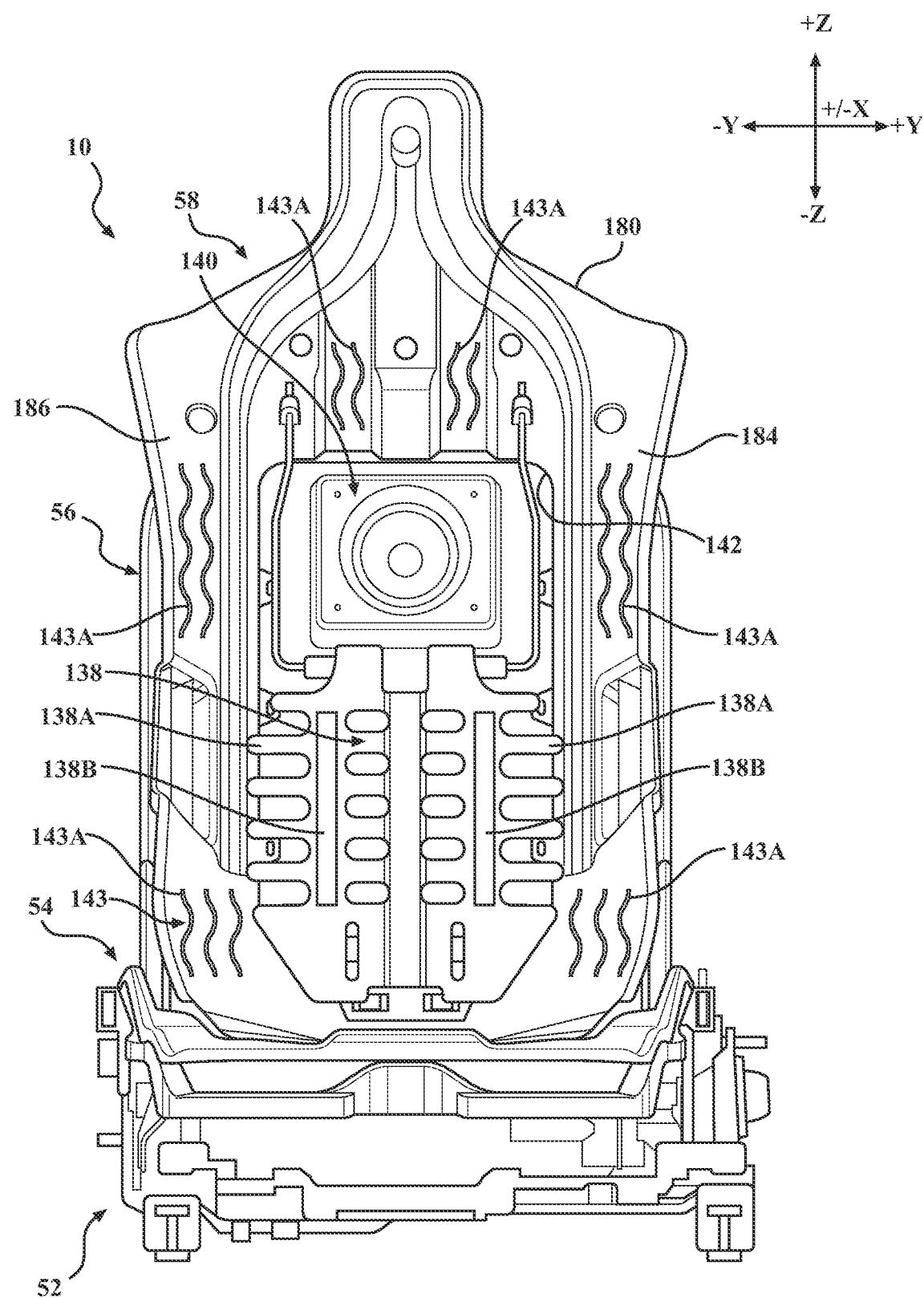
FIG. 2 schematically depicts a front view of the kinetic seat assembly of FIG. 1, according to one or more embodiments shown and described herein.

Referring still to FIG. 2, the secondary seat back frame 58 may include a heating mechanism 143 for heating a surface of the secondary seat back frame 58. The heating mechanism 143 may include one or more heating coils 143A arranged on or in the secondary seat back frame 58. Specifically, the heating coils 143A may be provided at one or more of the upper end 180, the lower end 182, or one of the side ends 184, 186 of the secondary seat back frame 58. In some embodiments, the heating coils 143A of the heating mechanism 143 are positioned between the secondary seat back frame 58 and the padding 13. In other embodiments, the heating coils 143A may be provided in the secondary seat back frame 58 itself. In embodiments, the heating mechanism 143 may include a plurality of separate heating coils 143A arranged parallel to one another extending in the kinetic seat vertical direction along a forward-facing surface of the secondary seat back frame 58. In other embodiments, the heating mechanism 143 may include a single heating coil 143A formed in a sinusoidal arrangement provided along the forward-facing surface of the secondary seat back frame 58. The heating mechanism 143 is electronically connected to the electronic control unit 32, which, upon receiving a signal such as from the user interface 24 or a control device on the kinetic seat assembly 10, sends a signal to the heating mechanism 143 to adjust the parameters of the heating mechanism 143 accordingly such as, for example, a temperature of the heating mechanism 143.

Referring still to FIG. 2, the secondary seat back frame 58 may include a power lumbar mechanism 138. The power lumbar mechanism 138 may include a flexible member 138A and configured to flex away from the primary seat back frame 56 to increase a contour of the power lumbar mechanism 138 and toward the primary seat back frame 56 to decrease the contour of the power lumbar mechanism 138. The power lumbar mechanism 138 may include one or more actuators 138B to cause the power lumbar mechanism 138 to flex in the manner discussed herein at one or more locations along the power lumbar mechanism 138. In embodiments, a plurality of actuators 138B may be provided to extend along the power lumbar mechanism in the kinetic seat vertical direction to selectively flex corresponding regions of the lumbar mechanism 138. The power lumbar mechanism 138 is electronically connected to the electronic control unit 32, which, upon receiving a signal such as from the user interface 24 or a control device on the kinetic seat assembly 10, sends a signal to the power lumbar mechanism 138, specifically the flexible member 138A and/or the one or more actuators 138B, to adjust the contour of the power lumbar mechanism 138 accordingly. By adjusting the contour of the power lumbar mechanism 138, the secondary seat back frame 58 may be better configured to more comfortably conform to the shape of the occupant's back. In embodiments, the heating coils 143A may be provided on the power lumbar mechanism 138.

Figure 18:
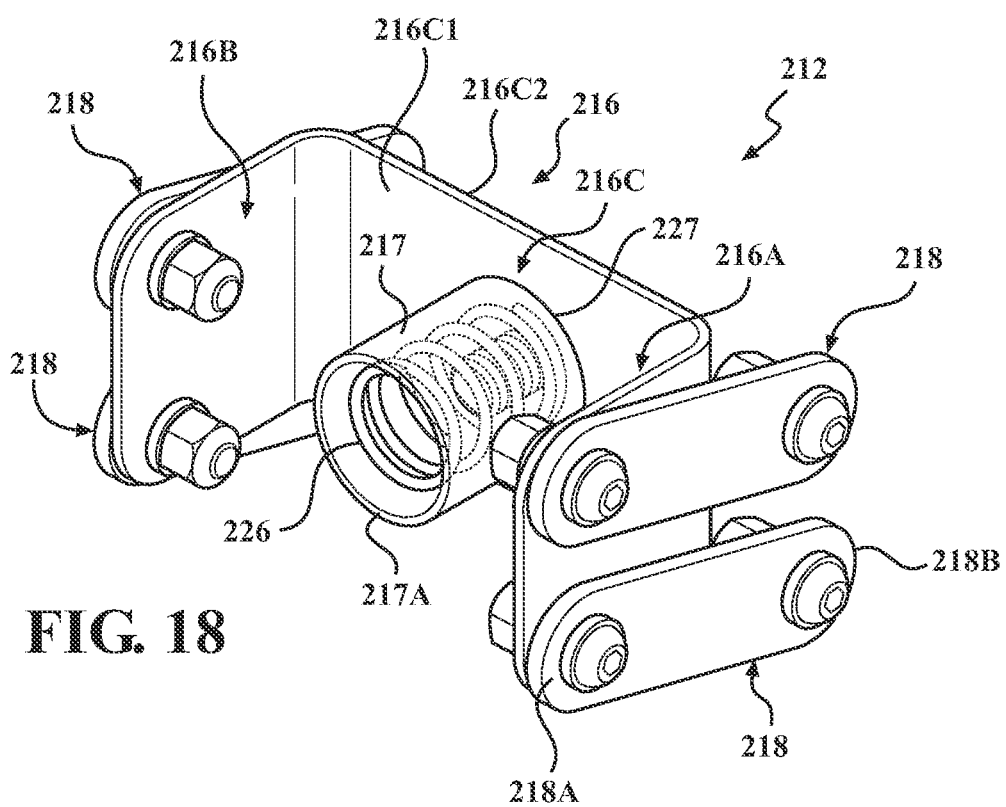
FIG. 18 schematically depicts a front perspective view of the upper pivot mechanism of the kinetic seat assembly of FIG. 1 in a first position, according to one or more embodiments shown and described herein.
Figure 19:
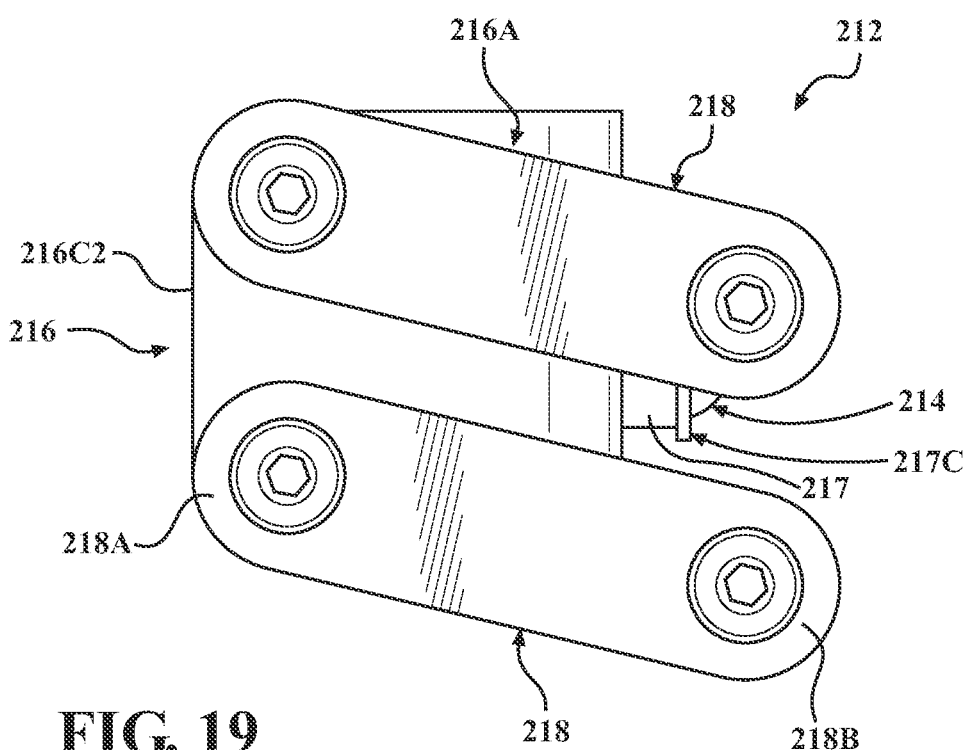
FIG. 19 schematically depicts a side view of the upper pivot mechanism of FIG. 18 in the first position, according to one or more embodiments shown and described herein.
Figure 20:
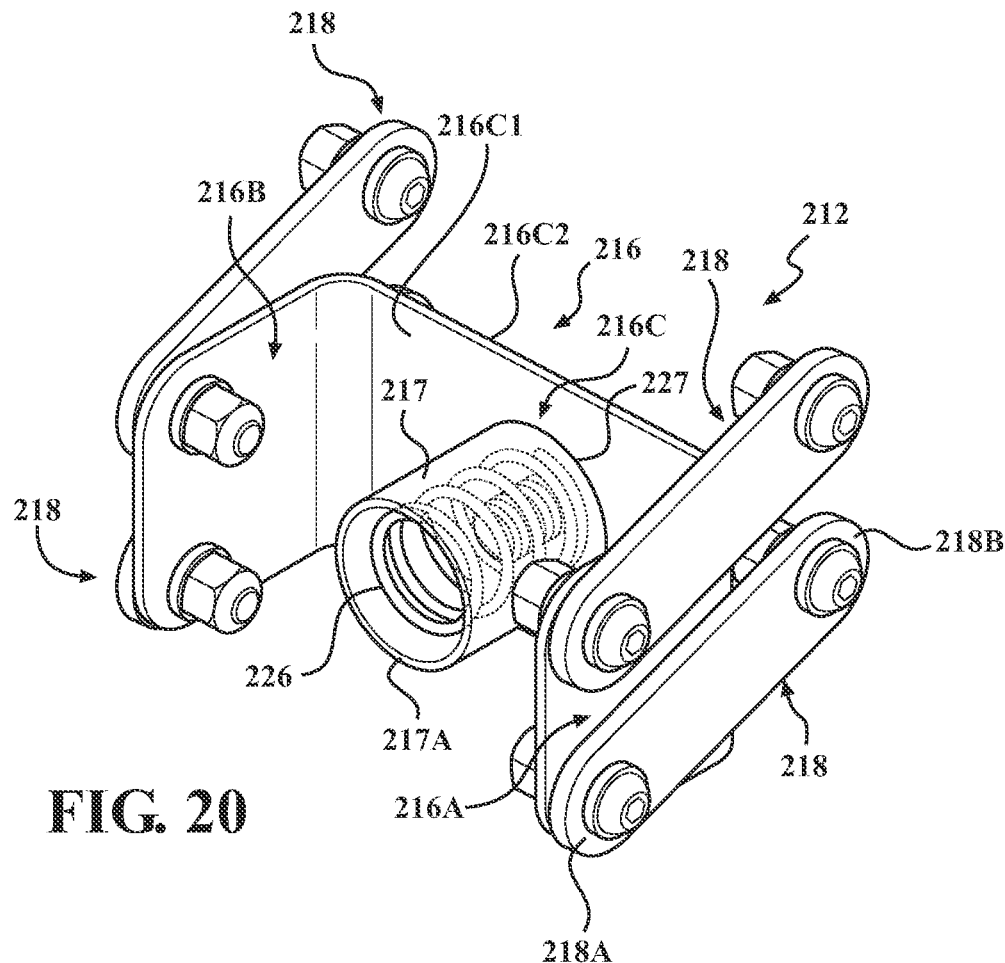
FIG. 20 schematically depicts a front perspective view of the upper pivot mechanism of FIG. 18 in a second position, according to one or more embodiments shown and described herein.
Figure 21:
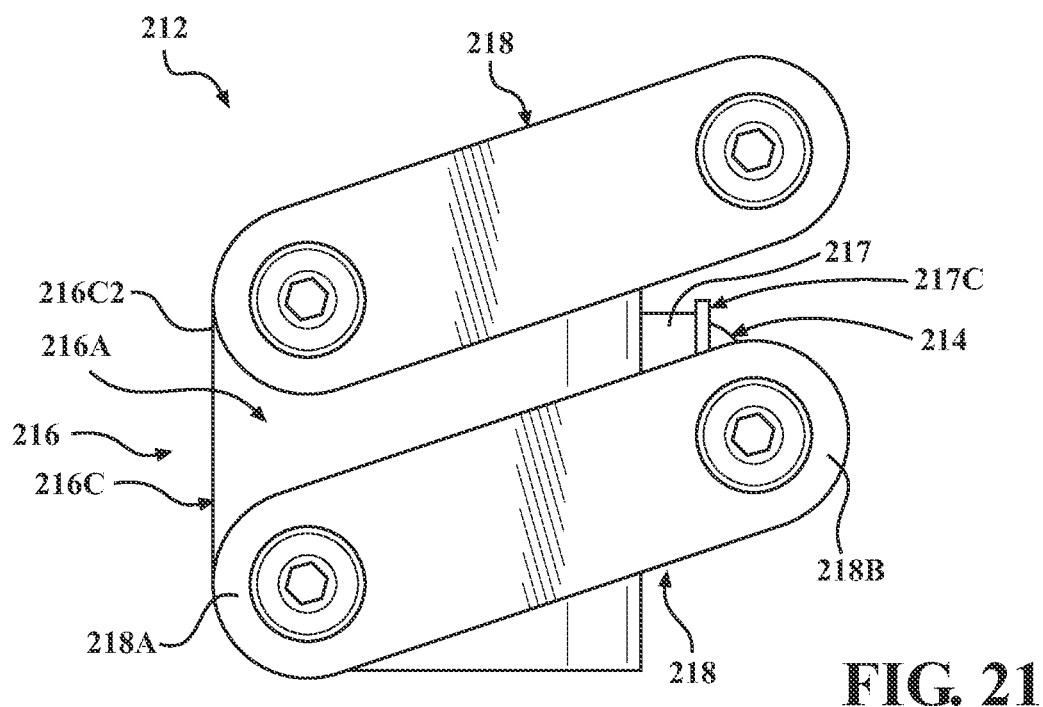
FIG. 21 schematically depicts a side view of the upper pivot mechanism of FIG. 18 in the second position, according to one or more embodiments shown and described herein.
Figure 22A:
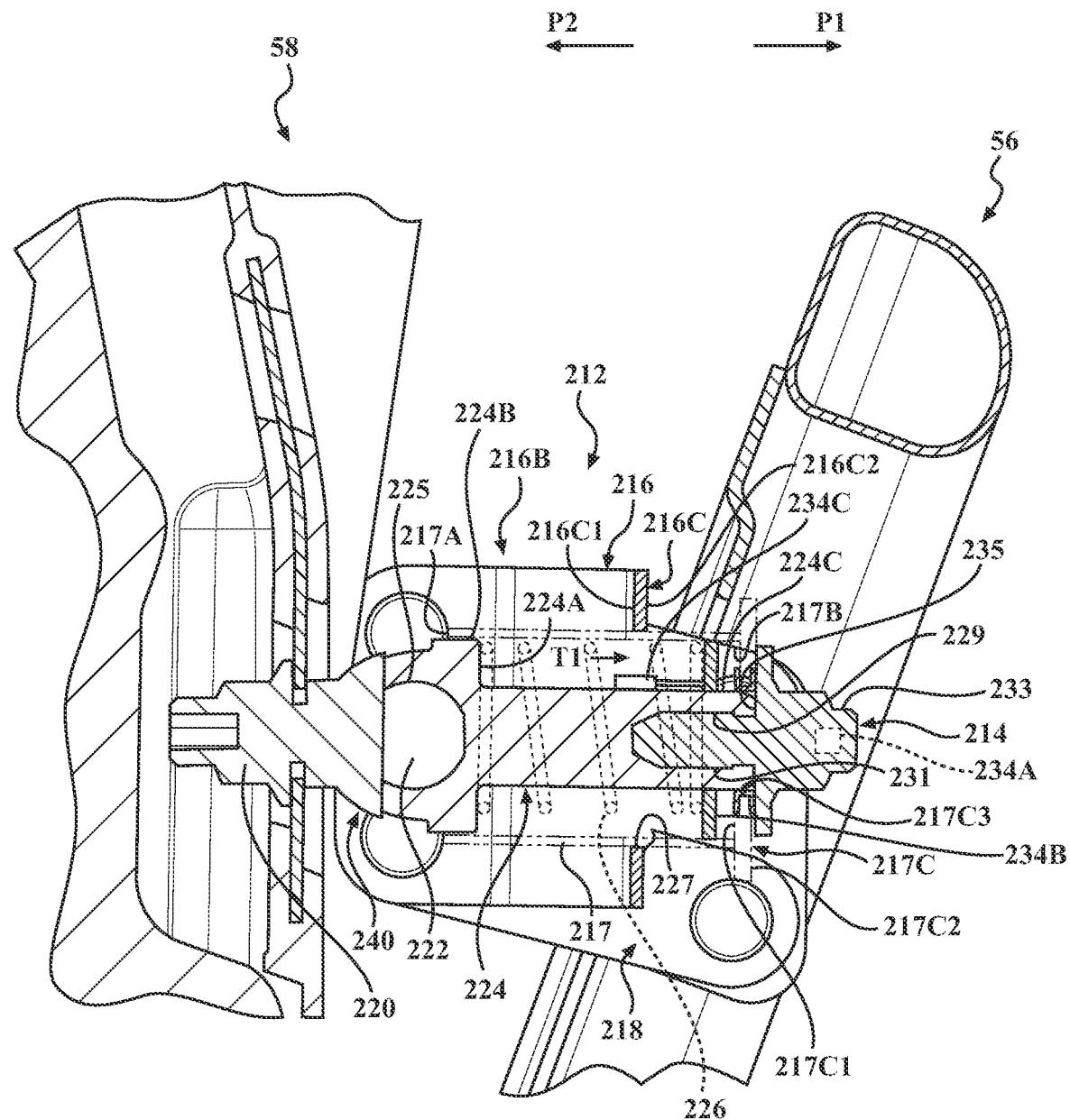
FIG. 22A schematically depicts a cross-sectional view of the upper pivot mechanism of FIG. 18 taken along line 22A-22A of FIG. 8 in the first position mounted to the primary seat back frame and the secondary seat back frame, according to one or more embodiments shown and described herein.
Figure 22B:
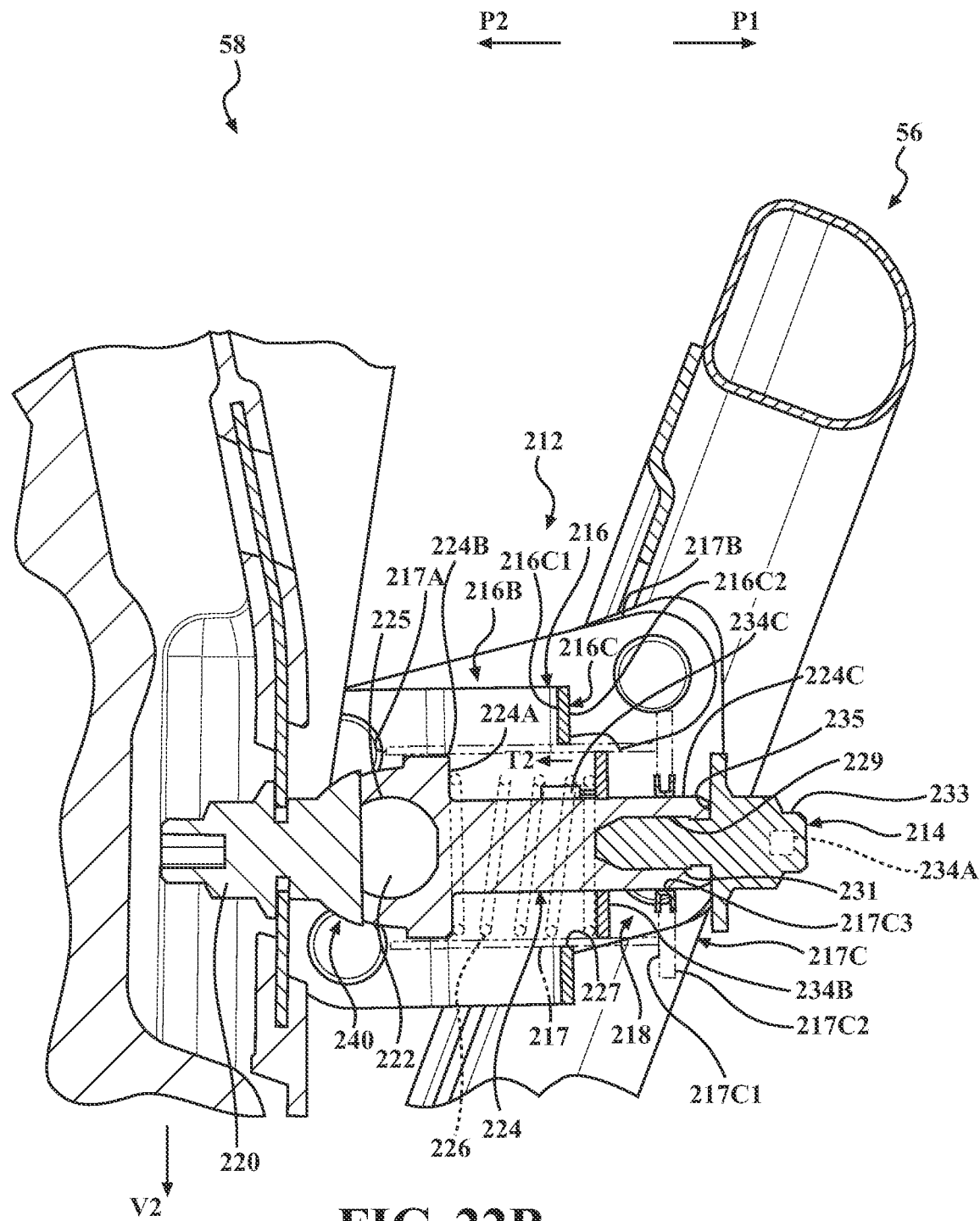
FIG. 22B schematically depicts a cross-sectional view of the upper pivot mechanism of FIG. 18 in the second position mounted to the primary seat back frame and the secondary seat back frame, and the secondary seat back frame moved toward the primary seat back frame, according to one or more embodiments shown and described herein.

Referring now to FIGS. 18-22B, the upper pivot mechanism 212 is shown in greater detail. As shown in FIGS. 18 and 19, the upper pivot mechanism 212 is positioned in a first position to raise the secondary seat back frame 58 relative to the primary seat back frame 56. As shown in FIGS. 20 and 21, the upper pivot mechanism 212 is positioned in a second position to lower the secondary seat back frame 58 relative to the primary seat back frame 56. It should be appreciated that the upper pivot mechanism 212 is also positionable in a plurality of intermediate positions between the first position and the second position to position the secondary seat back frame 58 in a plurality of intermediate vertical positions relative to the primary seat back frame 56. As shown in FIG. 22A, the upper pivot mechanism 212 is in the first position in which the secondary seat back frame 58 is moved in a first vertical direction V1 relative to the primary seat back frame 56 and the secondary seat back frame 58 is moved in a first longitudinal direction P1 toward the primary seat back frame 56. Alternatively, as shown in FIG. 22B, the upper pivot mechanism 212 is in the second position in which the secondary seat back frame 58 is moved in a second vertical direction V2 relative to the primary seat back frame 56 opposite the first vertical direction V1 and the secondary seat back frame 58 is moved in a second longitudinal direction P2 away the primary seat back frame 56 and opposite the first longitudinal direction P1.

Referring now to FIGS. 18-21, the upper pivot mechanism 212 includes a U-shaped bracket 216 having a first side wall 216A, an opposite second side wall 216B, and a medial wall 216C extending between the first side wall 216A and the second side wall 216B. The first side wall 216A and the second side wall 216B extend perpendicular to the medial wall 216C in the kinetic seat longitudinal direction. The medial wall 216C has an interior surface 216C1, an exterior surface 216C2, and an opening 227 formed therein. A pair of pivotable links 218 are provided on each of the first side wall 216A and the second side wall 216B. As shown a pair of pivotable links 218 are provided on each of the first side wall 216A and the second side wall 216B. As shown in FIG. 22A, each pivotable link 218 has a first end 218A rotatably mounted to the U-shaped bracket 216 and an opposite second end 218B rotatably mounted to the primary seat back frame 56.

The upper pivot mechanism 212 also includes a hollow tubular member 217 extending through the opening 227 in the medial wall 216C. As shown in FIG. 22A, the tubular member 217 has an open first end 217A and an opposite second end 217B closed off by a backing member 217C. The backing member 217C has an interior surface 217C1 and an exterior surface 217C2. An opening 217C3 is formed in the backing member 217C, the opening 217C3 extends between the interior surface 217C1 and the exterior surface 217C2. The tubular member 217 is fixed within the opening 227 formed in the medial wall 216C of the U-shaped bracket 216.

Figure 17:
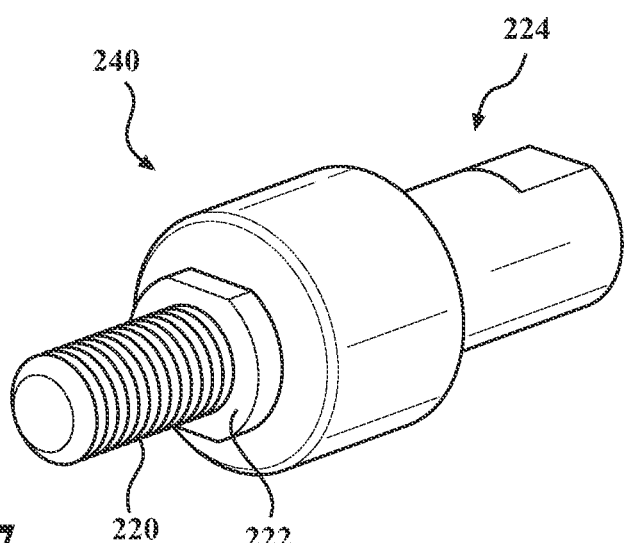
FIG. 17 schematically depicts a perspective view of a ball joint and coupling of an upper pivot mechanism of the kinetic seat assembly of FIG. 1, according to one or more embodiments shown and described herein.

The upper pivot mechanism 212 includes a ball joint 240 including a shaft 220 fixed to the secondary seat back frame 58, and a ball 222 received within a ball cavity 225 of a connector 224 extending opposite the shaft 220. The connector 224 is at least partially received within the tubular member 217 and has an internally threaded bore 229 formed therein which is dimensioned to movably extend through the opening 217C3 formed in the backing member 217C. The ball joint 240 permits the secondary seat back frame 58 to rotate about an X, a Y, and a Z-axis with respect to the primary seat back frame 56 in order to move the secondary seat back frame 58 in a roll, a pitch, and a yaw direction. Thus, the secondary seat back frame 58 is movable in the kinetic seat vertical direction due to rotation of the ball 222 of the ball joint 240 within the connector 224 and pivoting of the pivotable links 218 relative to the primary seat back frame 56. As shown in greater detail in FIG. 17, the ball joint 240 and the connector 224 are illustrated with the ball joint 240 received within an open end of the connector 224.

Referring again to FIG. 22A, the connector 224 has a hub 224B defining the ball cavity 225, and a pin 224C extending from the hub 224B. The pin 224C defines the internally threaded bore 229. The hub 224B has an outer diameter greater than an outer diameter of the pin 224C. The outer diameter of the pin 224C is less than a diameter of the opening of the backing member 217C such that the pin 224C is permitted to move through the opening 217C3 of the backing member 217C. A shoulder 224A is defined by the difference in diameter between the hub 224B and the pin 224C.

In embodiments, the upper pivot mechanism 212 includes an adjustment device 214 provided at the U-shaped bracket 216 and accessible from the exterior surface 217C2 of the backing member 217C. The adjustment device 214 may include a head 233 having a contact surface 235 and an opposite externally threaded shaft 231 which engages the internally threaded bore 229 of the connector 224. In embodiments, the adjustment device 214 is a fastener, rotatable knob, button, or the like.

In embodiments, the upper pivot mechanism 212 further includes an electronic control unit 234A, a plate 234B provided within the tubular member 217 and through which the connector 224 extends, and a linear actuator 234C. The electronic control unit 234A is in electronic communication with the linear actuator 234C to cause the plate 234B to move in the kinetic seat vehicle direction along a length of the connector 224. In embodiments, the electronic control unit 234A is communicatively coupled to the adjustment device 214. The electronic control unit 234A may be electronically coupled to the electronic control unit 32.

The upper pivot mechanism 212 further includes a biasing member 226 provided within the tubular member 217 and extending between the shoulder 224A formed in the connector 224 and the plate 234B. Accordingly, as described herein, movement of the plate 234B in the kinetic seat longitudinal direction will result in an increased or decreased biasing force on the secondary seat back frame 58 by the biasing member 226.

In use, rotation of the adjustment device 214 in a first direction results in the linear actuator 234C being operated in a first mode to move the plate 234B in a first direction T1 along the connector 224, as shown in FIG. 22A. As the plate 234B moves in the first direction T1, the biasing member 226 is permitted to extend between the plate 234B and the shoulder 224A of the connector 224 thereby increasing a damping effect when the secondary seat back frame 58 moves in a first longitudinal direction P1 toward the primary seat back frame 56 and, specifically, as the connector 224 moves through the opening 217C3 formed in the backing member 217C. The biasing member 226 then provides a biasing force against the secondary seat back frame 58 to move the secondary seat back frame 58 in an opposite second longitudinal direction P2 such that the connector 224 retracts out of the opening 217C3 formed in the backing member 217C, as shown in FIG. 22A.

Alternatively, rotation of the adjustment device 214 in an opposite second direction results in the linear actuator 234C being operated in a second mode to move the plate 234B in a second direction T2 along the connector 224, as shown in FIG. 22B. As the plate 234B moves in the second direction T2, the biasing member 226 is compressed between the plate 234B and the shoulder 224A of the connector 224 thereby decreasing a damping effect when the secondary seat back frame 58 moves in the first longitudinal direction P1 toward the primary seat back frame 56 and, specifically, as the connector 224 moves through the opening 217C3 formed in the backing member 217C, as shown in FIG. 22B. The biasing member 226 then provides a biasing force against the secondary seat back frame 58 to move the secondary seat back frame 58 in the second longitudinal direction P2 such that the connector 224 retracts out of the opening 217C3 formed in the backing member 217C.

In embodiments, the plate 234B may be moved in the first direction T1 or the second direction T2 by manual operation of the adjustment device 214 by accessing the adjustment device 214 from a rear side of the primary seat back frame 56 and rotating the adjustment device 214, or electronically operated by communicating with the electronic control unit 234A itself. In embodiments in which the plate 234B is moved by manual operation of the adjustment device 214, rotation of the adjustment device 214 may be coupled to the plate 234B by a worm gear, a bevel gear, or the like to convert rotational movement of the adjustment device 214 to linear movement of the plate 234B in the first direction T1 and the second direction T2.

As noted above, and shown in FIGS. 27 and 28, the secondary seat cushion frame 54 and the secondary seat back frame 58 are connected to one another at the rear end 90 and the lower end 182, respectively, by the linkage assembly 60. As discussed herein, the linkage assembly 60 ensures that the secondary seat cushion frame 54 and the secondary seat back frame 58 move in phase, i.e., in unison and in the same direction, with one another.

Figure 26:
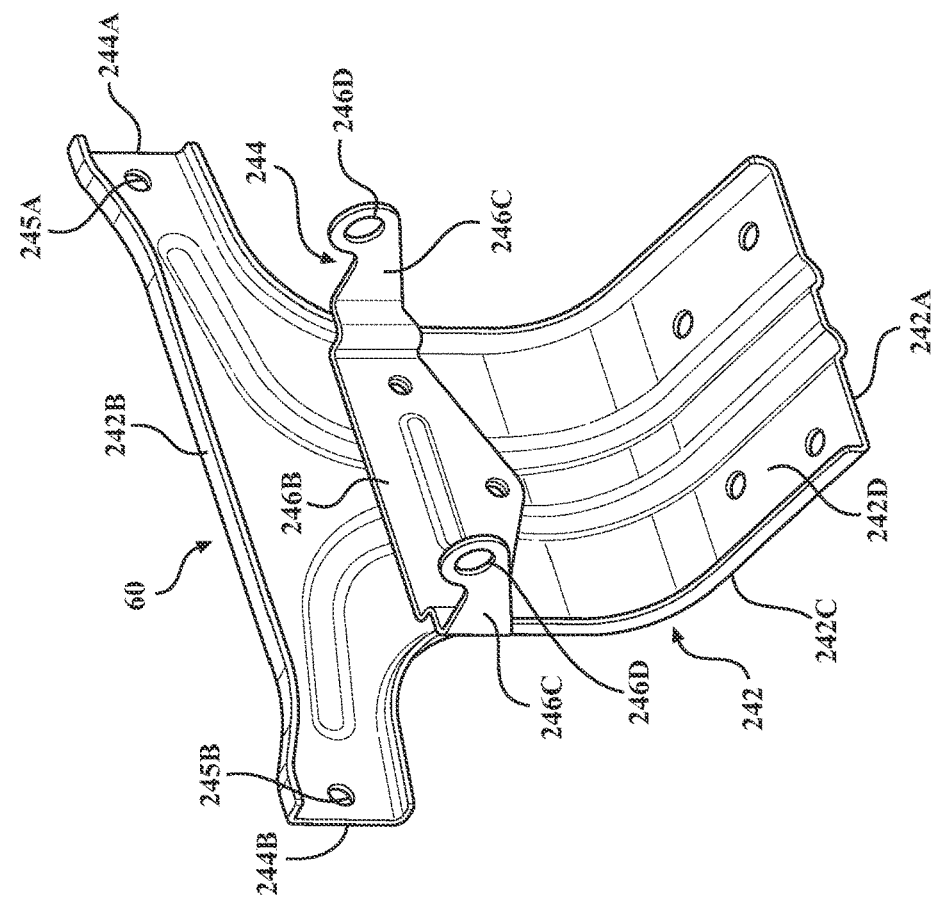
FIG. 26 schematically depicts another front perspective view of the linkage assembly of FIG. 25, according to one or more embodiments shown and described herein.
Figure 25:
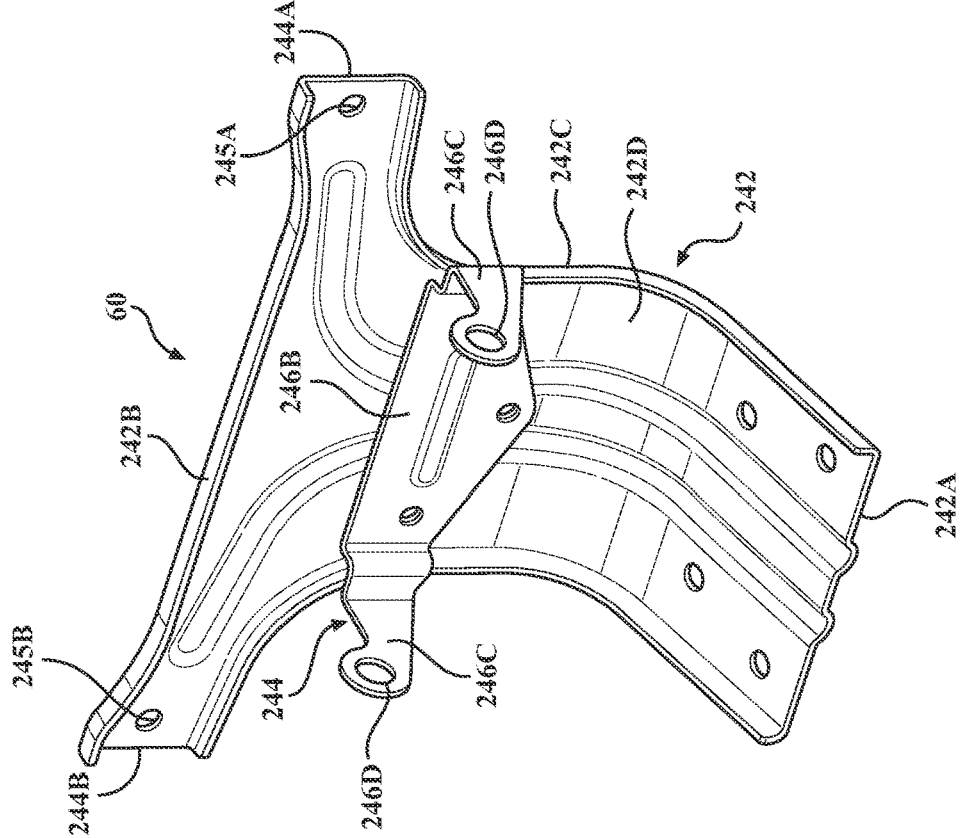
FIG. 25 schematically depicts a front perspective view of a linkage assembly of the kinetic seat assembly of FIG. 1, according to one or more embodiments shown and described herein.

As shown in FIGS. 23 and 24, the linkage assembly 60 includes an L-shaped connection bracket 242 having a first end 242A mounted to the rear end 90 of the secondary seat cushion frame 54 and an opposite second end 242B. The L-shaped connection bracket 242 also has a rear surface 242C and an opposite front surface 242D. The L-shaped connection bracket 242 includes a pair of spaced apart eyelets 244A, 244B positioned on opposite sides of the L-shaped connection bracket 242 extending through the rear surface 242C and the front surface 242D. The eyelets 244A, 244B extend in opposite kinetic seat lateral directions and define holes 245A, 245B Referring now to FIGS. 25 and 26, the linkage assembly 60 includes a connector bracket 244 fixedly attached to the front surface 242D of the L-shaped connection bracket 242. The connector bracket 244 includes a base wall 246B and a pair of side walls 246C. The pair of side walls 246C extends substantially perpendicular to the base wall 246B in the kinetic seat longitudinal direction and an opening 246D is formed at a distal end of each side wall 246C opposite the base wall 246B. The openings 246D are coaxial with one another to define a reclining axis Rm about which the secondary seat back frame 58 rotates relative to the connector bracket 244, as discussed herein. As such, the secondary seat cushion frame 54 and the secondary seat back frame 58 are permitted to rotate about the reclining axis Rm.

Referring now to FIGS. 27 and 28, the secondary seat back frame 58 is rotatably mounted to the connector bracket 244. More particularly, the lower member 78 of the secondary seat back frame 58 is rotatably mounted to the connector bracket 244 by a fixing member 248, such as a pin, extending through a cavity 58A formed in a protrusion 58B extending from the lower member 78 of the secondary seat back frame 58 and the openings 246D formed in the side walls 246C of the connector bracket 244. Thus, the secondary seat cushion frame 54 is permitted to rotate relative to the secondary seat back frame 58 due to the connector bracket 244 being permitted to rotate relative to the connection bracket 242.

Figure 29:
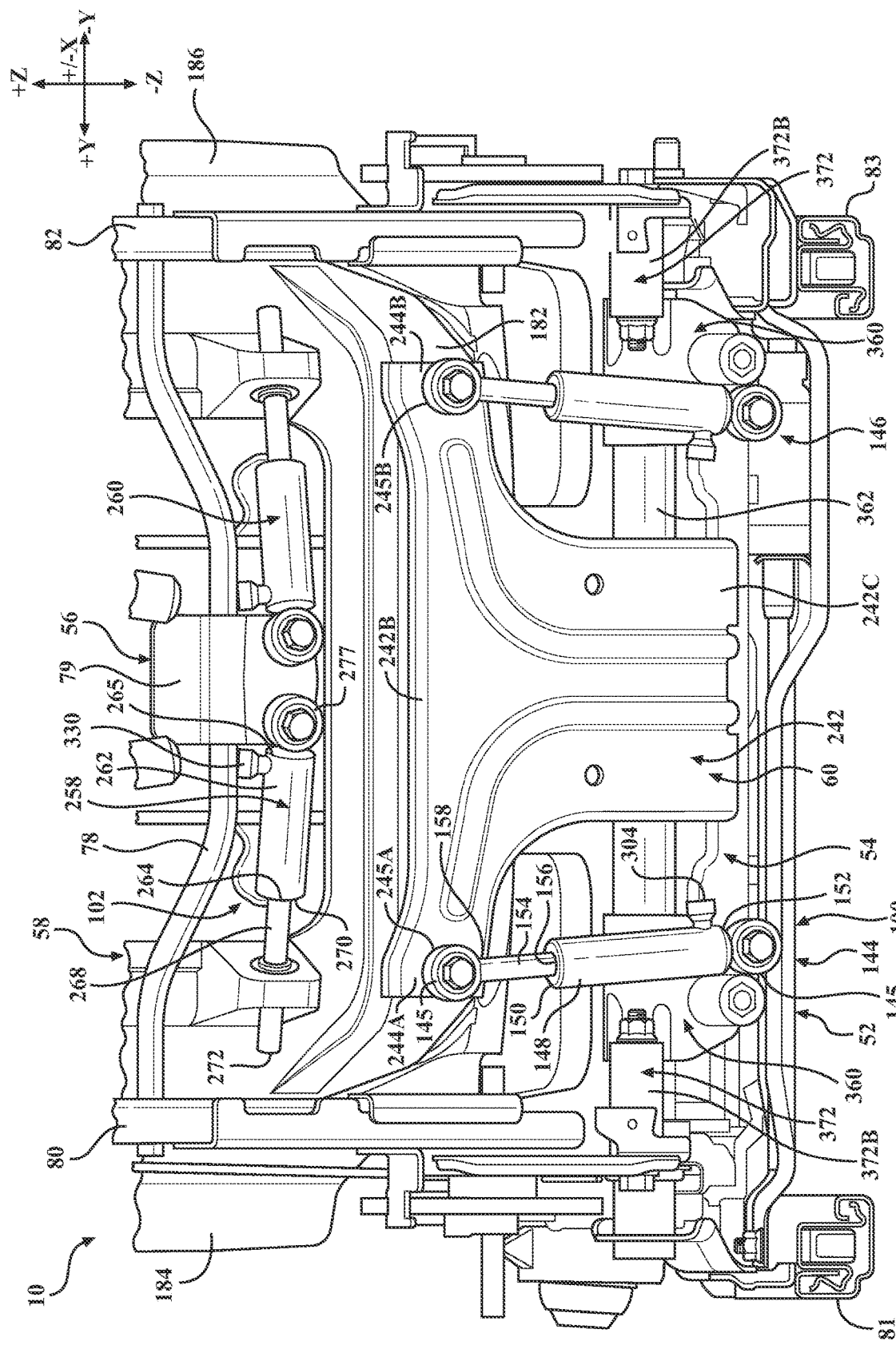
FIG. 29 schematically depicts a partial rear view of the kinetic seat assembly of FIG. 1, according to one or more embodiments shown and described herein.

Referring now to FIG. 29, the vertical damping mechanism 100 is shown between the eyelets 244A, 244B of the connector bracket 244 and a pair of clamps 360 provided on a rear rod 362 extending between opposite rails 81, 83 of the primary seat cushion frame 52. The vertical damping mechanism 100 includes first and second vertical dampers 144, 146 interconnecting the primary seat cushion frame 52 and the secondary seat cushion frame 54 due to the connection therebetween by the linkage assembly 60.

It is to be understood that each vertical damper 144, 146 is identical in structure and operation and, thus, only the first vertical damper 144 will be described in detail and with reference to FIG. 29. In some embodiments, the first vertical damper 144 includes an outer tube 148 and an inner tube 154. The outer tube 148 includes a first end 150 and an opposite second end 152. The inner tube 154 includes a first end 156 and an opposite second end 158. In some embodiments, the inner tube 154 and the outer tube 148 are permitted to rotate with respect to one another. Additionally, the inner tube 154 may extend and retract from the outer tube 148, but the inner tube 154 may be restricted from retracting completely out of the outer tube 148.

In some embodiments, as discussed in more detail below, the inner tube 154 slidably moves in and out of the first end 150 of the outer tube 148 in order to adjust the length of the first vertical damper 144 based on the movement of the secondary seat back frame 58 with respect to the primary seat cushion frame 52. In some embodiments, the first vertical damper 144 also includes a ball joint 145 at one or both ends of the first vertical damper 144 to provide necessary rotation of the first vertical damper 144 with respect to the primary seat cushion frame 52 and/or the secondary seat back frame 58.

Although not shown, in some embodiments, the first vertical damper 144 includes a biasing member, such as a spring, for providing a damping effect between the inner tube 154 and the outer tube 148. In other embodiments, the first vertical damper 144 may include a compressible fluid providing the damping effect between the inner tube 154 and the outer tube 148. The degree of the damping effect may be manually or electronically adjustable, as discussed in more detail herein.

It is to be understood that variations of the first vertical damper 144 may be contemplated and within the scope of the present disclosure. For example, in some embodiments, it is to be appreciated that the orientation of the outer tube 148 and the inner tube 154 may be switched such that the outer tube 148 is coupled to the secondary seat back frame 58 and the inner tube 154 is coupled to the primary seat cushion frame 52.

In some embodiments, the first vertical damper 144 is a shock absorber. In some embodiments, the first vertical damper 144 is a pneumatic actuator. As such, the first vertical damper 144 includes an inlet 304 for connecting to an air supply. Air is supplied into the first vertical damper 144, particularly the outer tube 148, to a predetermined amount to control the degree of damping. In some embodiments, the inlet 304 of the first vertical damper 144 is in fluid communication with an air supply located in the vehicle 12 to add air into the first vertical damper 144. To release pressure within the first vertical damper 144, a release valve may be activated in order to reduce the amount of damping. The release valve may be adjusted between an open position, a closed position, and a plurality of intermediate positions. The air released may be recirculated back into the air supply provided in the vehicle 12 or released into the atmosphere. Thus, vertical movement of the secondary seat back frame 58 may be reduced or increased as desired by the occupant by controlling the amount of pressure within the first vertical damper 144.

In other embodiments, although not shown, it is understood that each vertical damper 144, 146 may be an electric actuator, a hydraulic actuator, or any other suitable actuator for damping movement between the primary seat cushion frame 52 and the secondary seat back frame 58.

Figure 30:
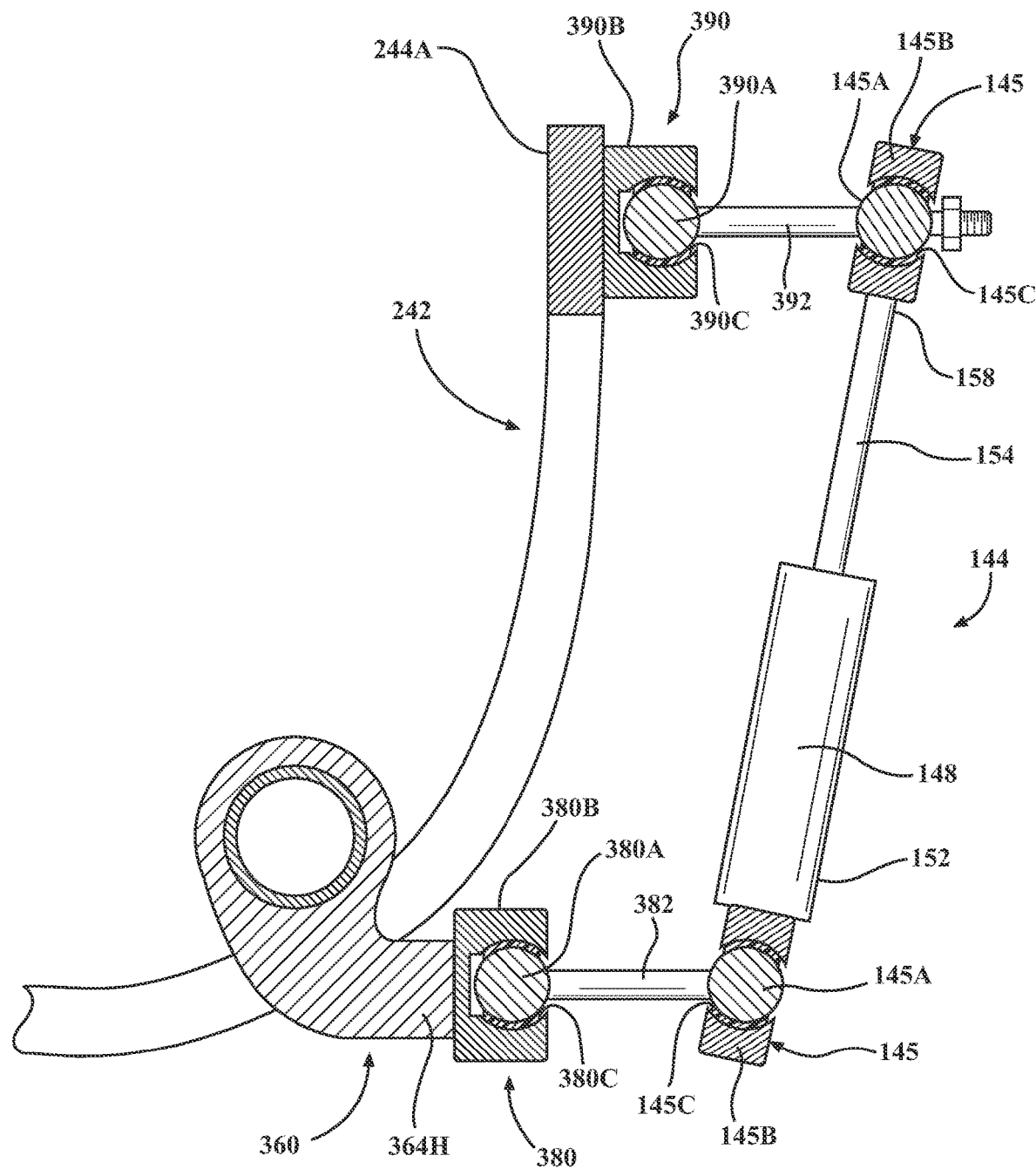
FIG. 30 schematically depicts a partial side view of a vertical damper of the kinetic seat assembly extending between a connector bracket and a clamp, according to one or more embodiments shown and described herein.

As shown in FIG. 30, a detailed side view of the first vertical damper 144 is shown coupled between the connector bracket 244 and the clamp 360. It should be appreciated that components illustrated in FIG. 30 and discussed herein may not be depicted in other figures for sake of simplification of illustration without limiting the scope of the present disclosure. In addition, it should be appreciated that the description of the first vertical damper 144 discussed herein and illustrated in FIG. 30 is equally applicable to the second vertical damper 146. However, only the connection of the first vertical damper 144 is illustrated and described in detail herein.

As shown in FIG. 30, the first vertical damper 144 includes the ball joint 145 provided at the second end 152 of the outer tube 148, and the ball joint 145 provided at the second end 158 of the inner tube 154. Each ball joint 145 includes a ball 145A and a receiver 145B defining a cavity 145C for receiving the ball 145A. As shown, the first vertical damper 144 is spaced apart from the connection bracket 242 in the kinetic seat longitudinal direction. It should be appreciated that the first vertical damper 144 being spaced apart from the connection bracket 242 and, more specifically, the ball joints 145 being spaced apart from the connection bracket 242 allows for unrestricted pivoting movement of the second end 152 of the outer tube 148 and the second end 158 of the inner tube 154.

With more particularity, the second end 152 of the outer tube 148 is spaced apart from one of the clamps 360 to which the first vertical damper 144 is coupled. In embodiments, as shown, a ball joint 380 is provided at an upper clamp mount 364H of the clamp 360. The ball joint 380 includes a ball 380A and a receiver 380B defining a cavity 380C for receiving the ball 380A. A shaft 382 extends between the ball joint 145 at the second end 152 of the outer tube 148 and the ball joint 380 at the clamp 360 to space the second end 152 of the outer tube 148 away from the clamp 360. In embodiments, the shaft 382 may be fixed directly to the clamp 360 without providing the ball joint 380.

Additionally, the second end 158 of the inner tube 154 is spaced apart from the connection bracket 242 and specifically the eyelet 244A of the connection bracket 242 to which the first vertical damper 144 is coupled. In embodiments, as shown, a ball joint 390 is provided at the eyelet 244A of the connection bracket 242. The ball joint 390 includes a ball 390A and a receiver 390B defining a cavity 390C for receiving the ball 380A. A shaft 392 extends between the ball joint 145 at the second end 158 of the inner tube 154 and the ball joint 390 at the eyelet 244A of the connection bracket 242 to space the second end 158 of the inner tube 154 away from the connection bracket 242. In embodiments, the shaft 392 may be fixed directly to the connection bracket 242 without providing the ball joint 390. As such, the first vertical damper 144, as well as the second vertical damper 146, are allowed to articulate at the ball joint 380 and the ball joint 390. This allows for a greater degree of freedom of first vertical damper 144 rotating relative to the connection bracket 242 and the clamp 360.

Referring again to FIG. 29, the first and second vertical dampers 144, 146 are oriented at an angle relative to one another such that a distance between the second end 158 of the inner tube 154 of each vertical damper 144, 146 is greater than a distance between the second end 152 of the outer tube 148 of each vertical damper 144, 146. Stated another way, a distance between the end of each vertical damper 144, 146 coupled to the linkage assembly 60 is greater than an opposite end of each vertical damper 144, 146 coupled to the primary seat cushion frame 52. This configuration allows the vertical dampers 144, 146 to absorb vertical shock as the secondary seat cushion frame 54 and the secondary seat back frame 58 move in a kinetic seat vertical direction and to allow the secondary seat cushion frame 54 and the secondary seat back frame 58 to pivot.

Referring still to FIG. 29, the lateral damping mechanism 102 includes first and second lateral dampers 258, 260 interconnecting the primary seat back frame 56 and the secondary seat back frame 58. It is to be understood that each lateral damper 258, 260 is identical in structure and operation and, thus, only the first lateral damper 258 will be described in detail. In some embodiments, the first lateral damper 258 includes an outer tube 262 and an inner tube 268. The outer tube 262 includes a first end 264 and an opposite second end 265. The inner tube 268 includes a first end 270 and an opposite second end 272. In some embodiments, the inner tube 268 and the outer tube 262 are permitted to rotate with respect to one another. Additionally, the inner tube 268 may extend and retract from the outer tube 262, but the inner tube 268 may be restricted from retracting completely out of the outer tube 262.

In use, in some embodiments, as discussed in more detail below, the inner tube 268 slidably moves in and out of the first end 264 of the outer tube 262 in order to adjust the length of the first lateral damper 258 based on the movement of the secondary seat back frame 58 with respect to the primary seat back frame 56. In some embodiments, the first lateral damper 258 includes a ball joint 277 at the second end 265 of the outer tube 262 of the first lateral damper 258 to provide necessary rotation of the first lateral damper 258 with respect to the primary seat back frame 56. A ball joint 277 is also provided at the second end 272 of the inner tube 268 rotatably fixing the inner tube 268 to the secondary seat back frame 58.

In some embodiments, the first lateral damper 258 includes a biasing member, such as a spring, for providing a damping effect between the inner tube 268 and the outer tube 262. In other embodiments, the first lateral damper 258 may include a compressible fluid providing the damping effect between the inner tube 268 and the outer tube 262. The degree of the damping effect may be manually or electronically adjustable, as discussed in more detail herein.

In some embodiments, the first lateral damper 258 is a pneumatic actuator. As such, the first lateral damper 258 includes an inlet 330 for connecting to an air supply. Air is supplied into the first lateral damper 258, particularly the outer tube 262, to a predetermined amount to control the degree of damping. In some embodiments, the inlet 330 of the first lateral damper 258 is in fluid communication with an air supply located in the vehicle 12 to add air into the first lateral damper 258. To release pressure within the first lateral damper 258, a release valve may be activated in order to reduce the amount of damping. The release valve may be adjusted between an open position, a closed position, and a plurality of intermediate positions. The air released may be recirculated back into the air supply provided in the vehicle 12 or released into the atmosphere. Thus, lateral movement of the secondary seat back frame 58 may be reduced or increased as desired by the occupant by controlling the amount of pressure within the first lateral damper 258.

Although not shown, it is appreciated that the lateral dampers 258, 260 may be in communication with the electronic control unit 32 and operable via the user interface 24 for operating the amount of pressure within the lateral dampers 258, 260. As noted above, the display unit 22 may include the user interface 24 and may be located in any suitable location, such as on the dashboard of the vehicle 12, or otherwise within reach of the occupant such that the occupant may control the degree of damping in the kinetic seat assembly 10. It is to be appreciated that the lateral dampers 258, 260 may be operable between a Sport mode and a Comfort mode. When the occupant selects Sport mode, air may be released from the lateral dampers 258, 260 in order to allow for more extension and retraction of the inner tube 268 with respect to the outer tube 262. Alternatively, when the occupant selects Comfort mode, additional air is supplied in the lateral dampers 258, 260 in order to increase the pressure therein and limit the amount of extension and retraction of the inner tube 268 with respect to the outer tube 262.

In other embodiments, although not shown, it is understood that each lateral damper 258, 260 may be an electric actuator, a hydraulic actuator, or any other suitable actuator for damping movement between the primary seat back frame 56 and the secondary seat back frame 58.

Figure 31:
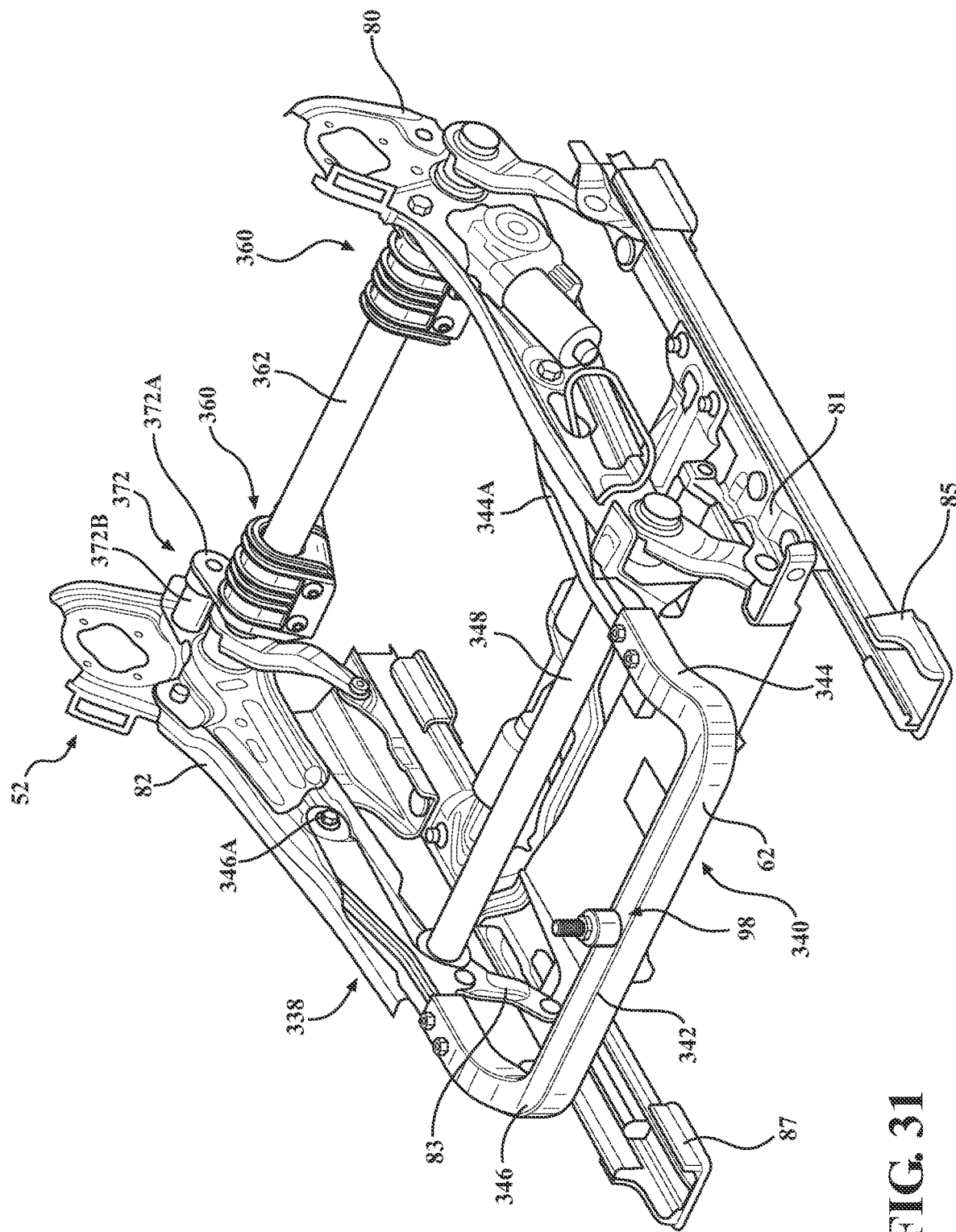
FIG. 31 schematically depicts a partial perspective view of the primary seat cushion frame and a tilt bar mechanism of the kinetic seat assembly of FIG. 1, according to one or more embodiments shown and described herein.
Figure 34:
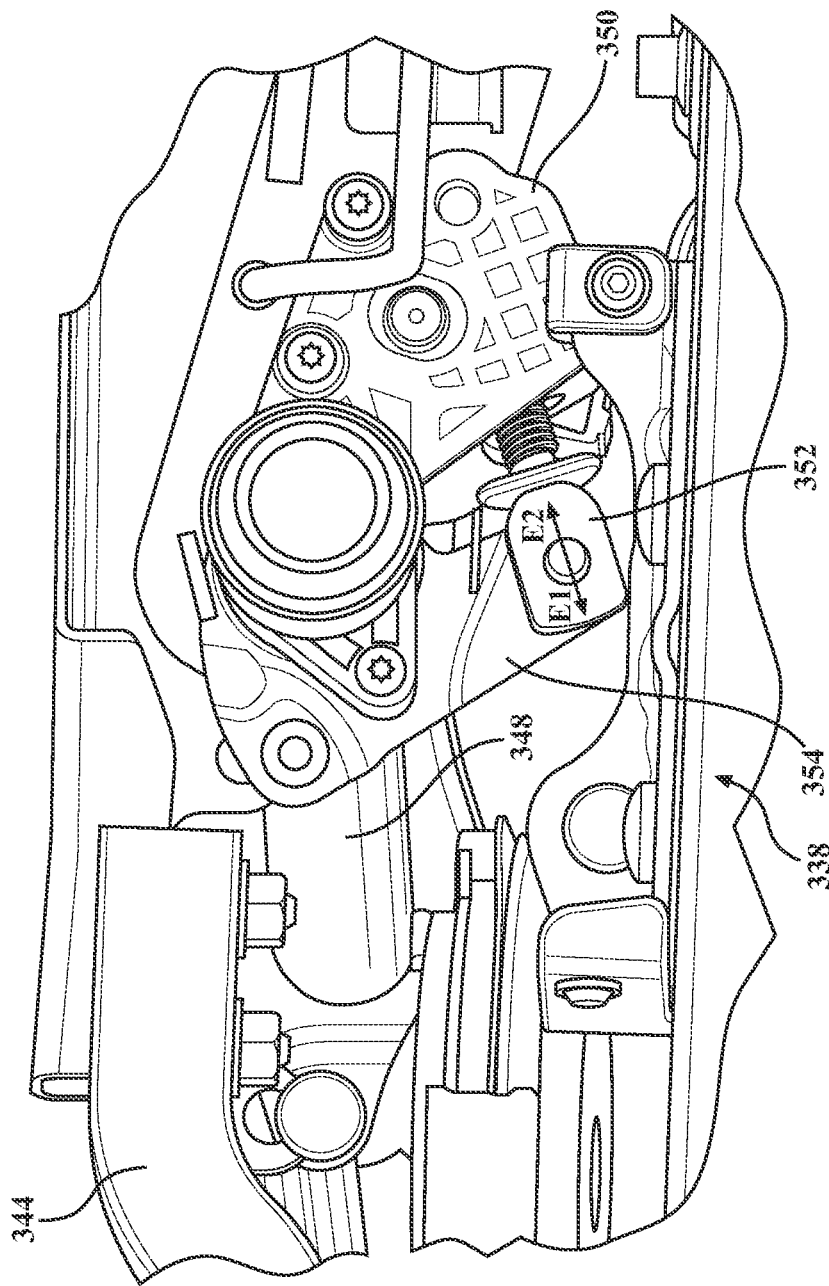
FIG. 34 schematically depicts an enlarged perspective view of a portion of the tilt mechanism of FIG. 31, according to one or more embodiments shown and described herein.

Referring now to FIGS. 31 and 34, in embodiments, the kinetic seat assembly 10 includes a seat cushion tilt mechanism 338 for tiling the secondary seat cushion frame 54 relative to the primary seat cushion frame 52. The seat cushion tilt mechanism 338 includes a tilt bar 340 including a tilt bar front portion 342 and a pair of tilt bar handles 344, 346 extending rearwardly in the kinetic seat longitudinal direction from opposite ends of the tilt bar front portion 342. A distal end 344A, 346A of each tilt bar handle 344, 346 opposite the tilt bar front portion 342 is rotatably attached to the side members 66, 68 of the primary seat cushion frame 52. The seat cushion tilt mechanism 338 also includes a forward rod 348 extending between side members 66, 68 of the primary seat cushion frame 52 and is positioned under the tilt bar handles 344, 346 such that movement of the forward rod 348 in the kinetic seat vertical direction causes the seat cushion tilt mechanism 338 to rotate about the distal end 344A, 346A of each tilt bar handle 344, 346 such that the tilt bar front portion 342 also moves upward in the kinetic seat vertical direction. As shown in FIG. 31, the front pivot mechanism 98 is received within the tilt bar front portion 342 to be coupled to the front end 88 of the secondary seat cushion frame 54. Thus, movement of the seat cushion tilt mechanism 338, specifically the tilt bar front portion 342, results in similar rotation of the front end 88 of the secondary seat cushion frame 54.

Referring again to FIG. 31, a pair of clamps 360 is provided on the rear rod 362 extending between the rails 81, 83 of the primary seat cushion frame 52. As described in more detail herein, the clamps 360 are provided for rotatably coupling the vertical dampers 144, 146 to the primary seat cushion frame 52 and maintaining a current degree of damping or extension of the vertical dampers 144, 146 during movement of the kinetic seat assembly 10 in the kinetic seat vertical direction as the rear rod 362 rotates.

Figure 32:
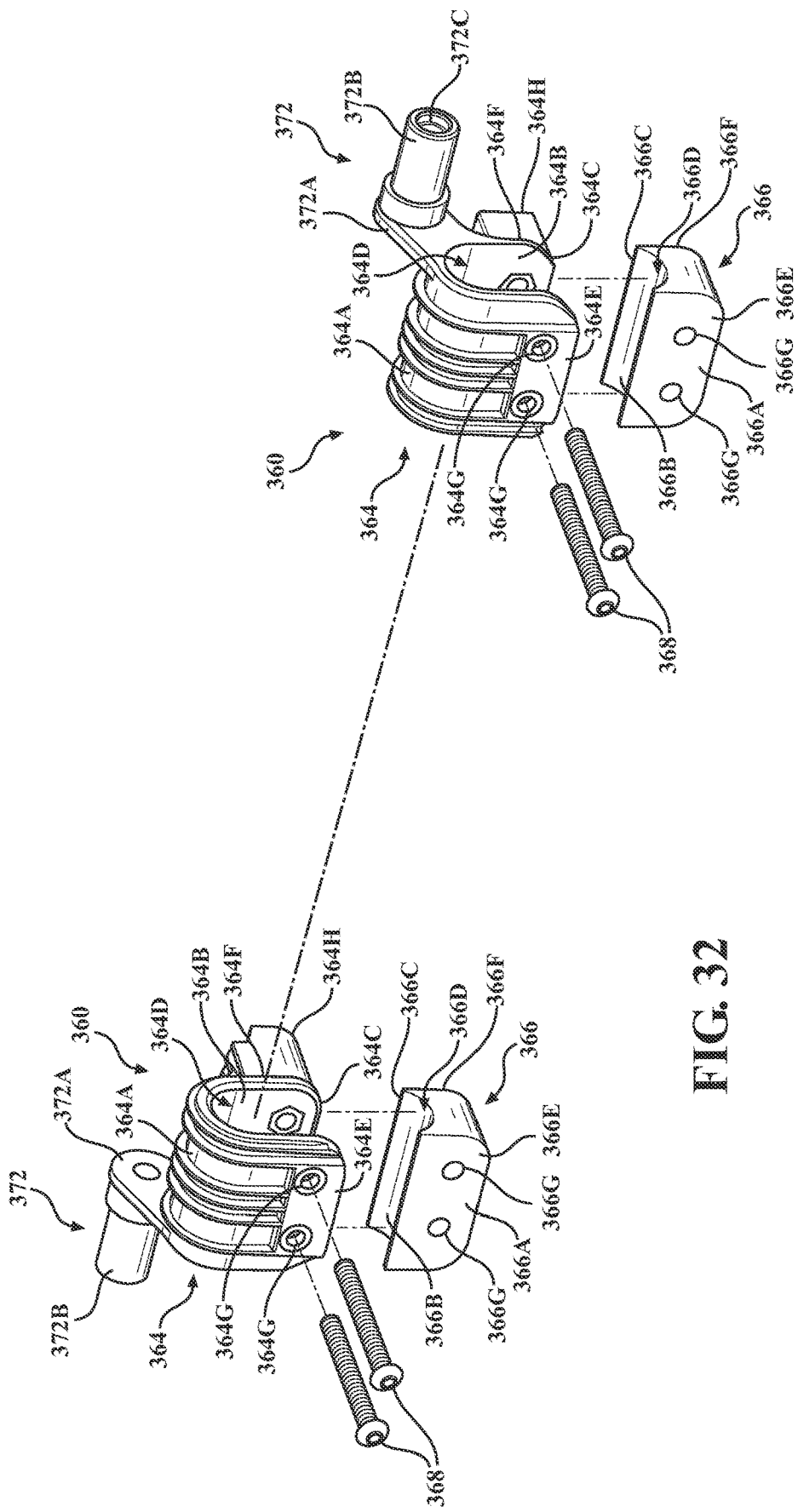
FIG. 32 schematically depicts an exploded, perspective view of a pair of clamps of the kinetic seat assembly of FIG. 1, according to one or more embodiments shown and described herein.
Figure 33:
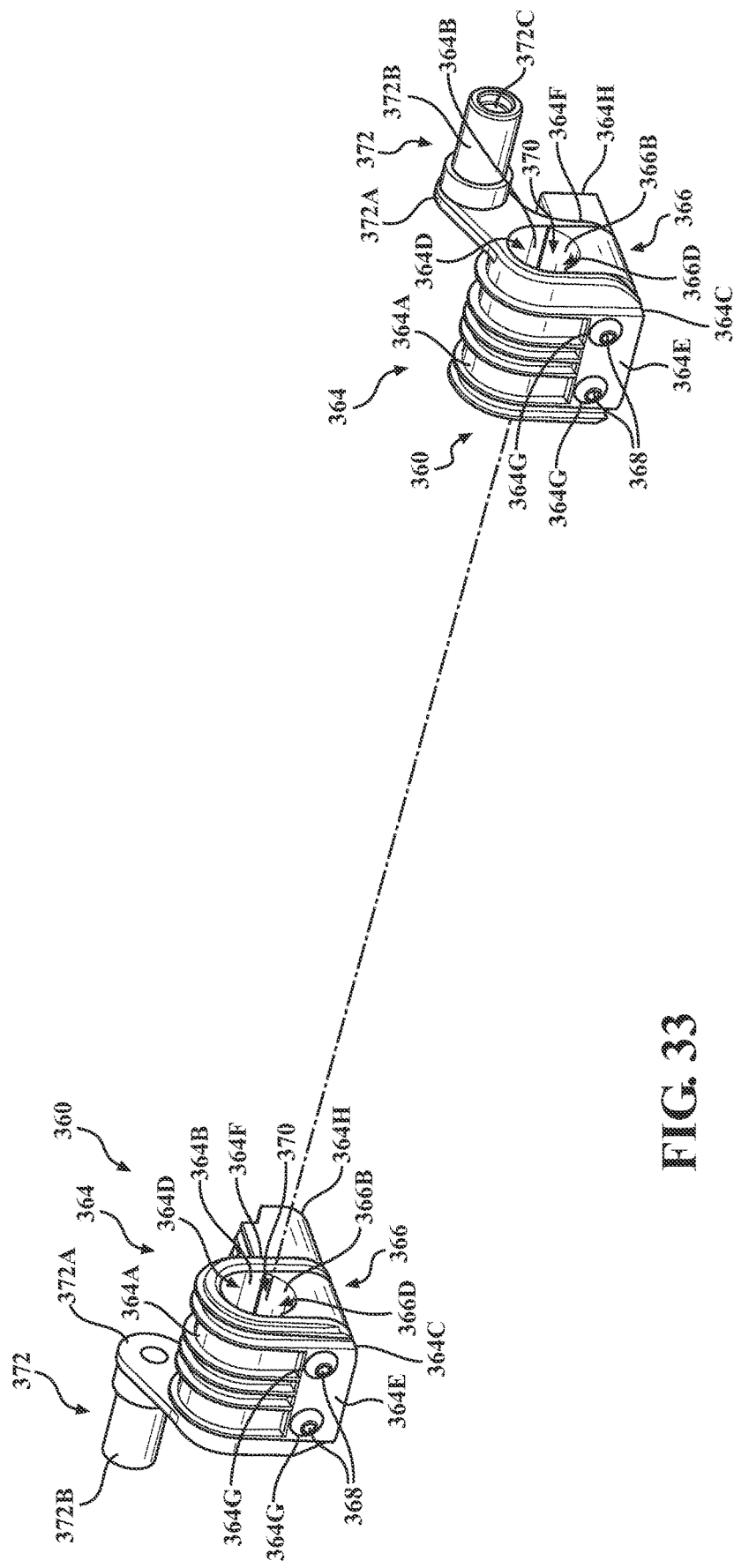
FIG. 33 schematically depicts a perspective view of the pair of clamps of FIG. 32 in an assembled state, according to one or more embodiments shown and described herein.

Referring now to FIGS. 32 and 33, the clamps 360 are illustrated in more detail separate from the rear rod 362. Each clamp 360 includes an upper clamp portion 364 and a lower clamp portion 366. The upper clamp portion 364 has an outer surface 364A and an inner surface 364B. The upper clamp portion 364 has an open lower end 364C and the inner surface 364B defines a concave upper channel 364D. The upper clamp portion 364 also has a front wall 364E and a rear wall 364F joined to one another and cooperating to define the concave upper channel 364D. A plurality of upper clamp holes 364G are formed in the upper clamp portion 364 extending through the front wall 364E and the rear wall 364F, and through the outer surface 364A and the inner surface 364B. An upper clamp mount 364H is provided on the outer surface 364A at the rear wall 364F for receiving a corresponding one of the vertical dampers 144, 146, as discussed in more detail herein. The upper clamp portion 364 further includes a clamp finger 372 extending from a side of the upper clamp portion 364. As shown, the clamp finger 372 extends from the rear wall 364F of the upper clamp portion 364. The clamp finger 372 includes a flange 372A extending from the rear wall 364F of the upper clamp portion 364 in a substantially kinetic seat longitudinal direction and a receiver 372B extending from a distal end of the flange 372A opposite the rear wall 364F of the upper clamp portion 364. The receiver 372B defines a channel 372C formed in an end thereof for mating with a portion of the primary seat cushion frame 52 and preventing rotation of the clamp 360 relative to the rear rod 362, as discussed herein.

The lower clamp portion 366 has an outer surface 366A and an inner surface 366B. The lower clamp portion 366 has an open upper end 366C and the inner surface 366B defines a concave lower channel 366D. The lower clamp portion 366 also has a front wall 366E and a rear wall 366F joined to one another and cooperating to define the concave lower channel 366D. A plurality of lower clamp holes 366G are formed in the lower clamp portion 366 extending through the front wall 366E and the rear wall 366F, and through the outer surface 366A of the lower clamp portion 366.

In assembling the clamp 360, the lower clamp portion 366 is inserted into the open lower end 364C of the upper clamp portion 364. The concave lower channel 366D and the concave upper channel 364D cooperate to define a bore 370 for receiving the rear rod 362, as described in more detail herein. With the lower clamp portion 366 positioned within the upper clamp portion 364, the lower clamp holes 366G are coaxial with corresponding upper clamp holes 364G. The upper clamp portion 364 and the lower clamp portion 366 are secured to one another by one or more fasteners 368, such as screws, rivets, and the like, extending through the upper clamp holes 364G and the lower clamp holes 366G. As shown, a pair of fasteners 368 is provided for securing the upper clamp portion 364 to the lower clamp portion 366. However, any number of fasteners 368 may be provided for securing the upper clamp portion 364 and the lower clamp portion 366 to one another. When in an assembled state, the upper clamp portion 364 and the lower clamp portion 366 define a bore 370.

As shown in FIGS. 29 and 31, the rear rod 362 is received within the bore 370 formed by the upper clamp portion 364 and the lower clamp portion 366, and the clamp finger 372 engages the primary seat cushion frame 52 to prevent the clamps 360 from moving along the longitudinal axis of the rear rod 362 and in the kinetic seat lateral direction. The clamps 360 may be rotatably coupled to the vertical dampers 144, 146 by one of the fasteners 368 extending through the upper clamp portion 364, the lower clamp portion 366, and the second end 152 of the outer tube 148 of the vertical dampers 144, 146. In other embodiments in which one of the fasteners 368 do not extend entirely through the upper clamp portion 364 and the lower clamp portion 366, a separate fastener may be used to rotatably couple the clamps 360 to the vertical dampers 144, 146, such as a separate fastener extending through the upper clamp mount 364H of the upper clamp portion 364.

As described herein, the kinetic seat assembly 10 is permitted to move in a kinetic seat vertical direction relative to the floor F. As the kinetic seat assembly 10 moves in the kinetic seat vertical direction, the rear rod 362 rotates. To ensure that the vertical dampers 144, 146 maintain the current amount of compression as the kinetic seat assembly 10 moves, the clamps 360 are permitted to rotate relative to the rear rod 362 and remain rotatably coupled to the vertical dampers 144, 146. Alternatively, if the clamps 360 were fixed to the rear rod 362, the degree of compression of the vertical dampers 144, 146 would increase or decrease in relation to the overall movement of the kinetic seat assembly 10 in the kinetic seat vertical direction and the rotation of the rear rod 362.

Referring again to FIG. 34, a portion of the seat cushion tilt mechanism 338 is shown in more detail. Particularly, the seat cushion tilt mechanism 338 further includes a fixed plate 350 and a drive member 352 extending from the fixed plate 350. The drive member 352 may be rotatably coupled to a pivotal plate 354 at an end of the drive member 352 opposite the fixed plate 350 such that extension of the drive member 352 from the fixed plate 350 in a direction E1 pivots the pivotal plate 354 and thus raises the forward rod 348, which raises the tilt bar 340 of the seat cushion tilt mechanism 338 and the front end 88 of the secondary seat cushion frame 54. Alternatively, retraction of the drive member 352 back into the fixed plate 350 in an opposition direction E2 results in the pivotal plate 354 rotating in an opposite direction to lower the forward rod 348, thus lowering of the tilt bar 340 of the seat cushion tilt mechanism 338 and the front end 88 of the secondary seat cushion frame 54. The drive member 352 may be a threaded shaft, actuator, and/or the like operated by a motor. The motor may be controlled by the electronic control unit 32. The seat cushion tilt mechanism 338 allows the entire secondary seat cushion frame 54 to tilt with respect to the primary seat cushion frame 52.

In use, the occupant controls the turning direction of the vehicle 12 by rotating the steering wheel 20. In doing so, the turning direction side shoulder of the occupant moves downward relative to the counter-turning direction side shoulder, and the turning direction side shoulder moves rearward relative to the counter-turning direction side shoulder. At this time, a steering operation can be comfortably performed if the occupant bends the lumbar spine in the turning direction and shortens a distance between the turning direction side pelvis and the shoulder compared to a distance between the counter-turning direction side pelvis and the shoulder, twists the lumbar spine, and pivotally moves the pelvis in the same direction as the turning direction side shoulder.

When the occupant directs the vehicle 12 in a turning direction, a force is applied onto the vehicle 12 and, thus, the occupant in the counter-turning direction. In a standard vehicle seat not equipped with moving to compensate for this force and allow the occupant to adjust a pelvis or torso position, the occupant will exhibit strain on these joints, including the knees, waist, and shoulders. In a seat in which the seat cushion frame and the seat back frame rotate in opposite directions, this strain on the occupant's joints is magnified.

The present disclosure seeks to eliminate these joint stresses by permitting the occupant seated in the kinetic seat assembly 10 to rotate with the force exhibited on the vehicle 12 during a turn. Thus, the present kinetic seat assembly 10 allows the pelvis and the torso of the occupant to rotate in order to maintain a center of gravity within the vehicle 12 in the direction of the turn.

As the occupant turns the vehicle 12 to the right, the occupant lowers the right shoulder and uses the trunk muscle so as to bend the lumbar spine to the right. This causes the occupant to pivotally move the pelvis counterclockwise in the rolling direction and clockwise in the yaw direction. In addition, the occupant pivotally moved the torso counterclockwise in the rolling direction and clockwise in the yaw direction. During a turn to the right, force is applied onto the occupant to the left. This further facilitates rotation of the torso and pelvis of the occupant to the left due to the momentum of the vehicle 12. As such, the secondary seat cushion frame 54 and the secondary seat back frame 58 move in phase with one another to the left due to their connection by the linkage assembly 60. Specifically, as shown in FIG. 8, during a right turn operation, the rear end 90 of the secondary seat cushion frame 54 moves in a first seat cushion direction X1 and the lower end 182 of the secondary seat back frame 58 moves in a first seat back direction Y1. The first seat cushion direction X1 and the first seat back direction Y1 are each directed along the same kinetic seat lateral direction. As the secondary seat cushion frame 54 and the secondary seat back frame 58 move to the left, the lateral damping mechanism 102 provides a controlled damping effect to reduce the force at which the secondary seat cushion frame 54 and the secondary seat back frame 58 move to the left. Alternatively, as the occupant turns the vehicle 12 to the left, the secondary seat cushion frame 54 and the secondary seat back frame 58 move in phase with one another to the right. Specifically, as shown in FIG. 8, during a right turn operation, the rear end 90 of the secondary seat cushion frame 54 moves in a second seat cushion direction X2 opposite the first seat cushion direction X1 and the lower end 182 of the secondary seat back frame 58 moves in a second seat back direction Y2 opposite the first seat back direction Y1. The second seat cushion direction X2 and the second seat back direction Y2 are each directed along the same kinetic seat lateral direction. As the secondary seat cushion frame 54 and the secondary seat back frame 58 move to the right, the lateral damping mechanism 102 provides a controlled damping effect to reduce the force at which the secondary seat cushion frame 54 and the secondary seat back frame 58 move to the right.

Referring again to FIG. 1, an imaginary line L extends from the front pivot mechanism 98 to the upper pivot mechanism 212. With respect to an occupant seated in the kinetic seat assembly 10, the line L generally extends through the shoulders of the occupant and the knees of the occupant. Thus, during use of the kinetic seat assembly 10, when undergoing movement during a right turn or a left turn, the kinetic seat assembly 10 ensures that the shoulders of the occupant and the knees of the occupant remain generally aligned with one another while allowing the occupant's waist to move in respective left and right directions in accordance with the above disclosure.

From the above, it is to be appreciated that defined herein is a new and unique kinetic seat assembly in which a seat cushion frame and a seat back frame rotate in phase with one another during movement of a vehicle, such as a turn. In doing so, the driver of the vehicle, or other occupant when the kinetic vehicle seat replaces a seat of a vehicle other than the driver seat, experiences a more comfortable driving experience in which the occupant's torso and waist move together.

What is claimed is:

1. A kinetic seat assembly comprising:
   a primary seat back frame;
   a secondary seat back frame; and
   an upper pivot mechanism coupling the secondary seat back frame to the primary seat back frame, the upper pivot mechanism comprising:
   a bracket; and
   a pivotable link extending from each of a pair of opposite sides of the bracket and interconnecting the bracket and the primary seat back frame, a first end of each of the pivotable links pivotally attached to the bracket, which is coupled to the secondary seat back frame, and an opposite second end each of the pivotable links pivotally fixed to the primary seat back frame,
   wherein the entire secondary seat back frame is permitted to move in a kinetic seat vertical direction relative to the primary seat back frame as the pivotable links permit the bracket to move in the kinetic seat vertical direction relative to the primary seat back frame.

2. The kinetic seat assembly of claim 1, wherein the bracket is a U-shaped bracket including a medial wall, a first side wall, and an opposite second side wall, the first side wall and the second side wall extend perpendicular to the medial wall.

3. The kinetic seat assembly of claim 2, further comprising:
   a first pair of pivotable links pivotally fixed to the first side wall at a first end thereof and to the primary seat back frame at an opposite second end thereof; and
   a second pair of pivotable links pivotally fixed to the second side wall at a first end thereof and to the primary seat back frame at an opposite second end thereof.

4. The kinetic seat assembly of claim 3, further comprising:
   a tubular member having fixed within an opening formed in the medial wall of the bracket, the tubular member having an open first end and an opposite second end;
   a backing member provided at the second end of the tubular member, the backing member having an opening formed therein; and
   a ball joint coupling the secondary seat back frame to the upper pivot mechanism.

5. The kinetic seat assembly of claim 4, wherein the ball joint comprises:
   a shaft fixed to the secondary seat back frame;
   a ball provided at an end of the shaft between the primary seat back frame and the secondary seat back frame; and
   a connector at least partially received within the tubular member and defining a ball cavity for receiving the ball,
   wherein the shaft is permitted to rotate relative to the connector as the ball rotates within the ball cavity of the connector.

6. The kinetic seat assembly of claim 5, wherein the connector includes a hub defining the ball cavity and a pin extending from the hub in a direction opposite the shaft, the hub has an outer diameter greater than an outer diameter of the pin, the outer diameter of the pin is less than a diameter of the opening formed in the backing member.

7. The kinetic seat assembly of claim 6, wherein:
   a shoulder is formed at the connector where the pin extends from the hub; and
   the kinetic seat assembly further comprises a biasing member provided within the tubular member between the backing member and the shoulder.

8. The kinetic seat assembly of claim 7, wherein:
   the connector defines an internally threaded bore;
   the kinetic seat assembly further comprises an adjustment device abutting against a surface of the backing member opposite the connector, the adjustment device having an externally threaded shaft engaging the internally threaded bore of the connector;
   rotation of the adjustment device in a first direction moves the connector in a first direction toward the adjustment device and increases compression of the biasing member; and
   rotation of the adjustment device in an opposite second direction moves the connector in a second direction away from the adjustment device and decreases compression of the biasing member.

9. The kinetic seat assembly of claim 8, wherein the adjustment device is manually adjustable and accessible from a rear side of the primary seat back frame opposite the secondary seat back frame.

* * * * *

UNITED STATES PATENT AND TRADEMARK OFFICE
CERTIFICATE OF CORRECTION

| | |
|---|---|
| PATENT NO. | : 12,194,903 B2 |
| APPLICATION NO. | : 17/873572 |
| DATED | : January 14, 2025 |
| INVENTOR(S) | : Todd Rupert Muck et al. |

It is certified that error appears in the above-identified patent and that said Letters Patent is hereby corrected as shown below:

In the Specification

In Column 4, Line(s) 55, delete "general" and insert --generally--, therefor.

In Column 5, Line(s) 37, delete "object" and insert --objects--, therefor.

Signed and Sealed this
Twenty-fifth Day of February, 2025

Coke Morgan Stewart
*Acting Director of the United States Patent and Trademark Office*